US008424769B2

(12) United States Patent
Kato

(10) Patent No.: US 8,424,769 B2
(45) Date of Patent: Apr. 23, 2013

(54) ANTENNA AND RFID DEVICE

(75) Inventor: Noboru Kato, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 13/472,520

(22) Filed: May 16, 2012

(65) Prior Publication Data

US 2012/0223149 A1 Sep. 6, 2012

Related U.S. Application Data

(63) Continuation of application No. PCT/JP2011/065431, filed on Jul. 6, 2011.

(30) Foreign Application Priority Data

Jul. 8, 2010 (JP) ................................ 2010-155342
Jan. 21, 2011 (JP) ................................ 2011-010458

(51) Int. Cl.
*G06K 19/00* (2006.01)

(52) U.S. Cl.
USPC .......................................... 235/487; 235/492

(58) Field of Classification Search .................. 235/487, 235/492
See application file for complete search history.

(56) References Cited

U.S. PATENT DOCUMENTS 3,364,564 A 1/1968 Kurtz et al.
4,794,397 A 12/1988 Ohe et al.
5,232,765 A 8/1993 Yano et al.
5,253,969 A 10/1993 Richert
5,337,063 A 8/1994 Takahira
5,374,937 A 12/1994 Tsunekawa et al.
5,399,060 A 3/1995 Richert
5,491,483 A 2/1996 D'Hont
5,528,222 A 6/1996 Moskowitz et al.
5,757,074 A 5/1998 Matloubian et al.
5,854,480 A 12/1998 Noto
5,903,239 A 5/1999 Takahashi et al.
(Continued)

FOREIGN PATENT DOCUMENTS

CA 2 279 176 A1 7/1998
DE 10 2006 057 369 A1 6/2008
(Continued)

OTHER PUBLICATIONS

Official communication issued in counterpart International Application No. PCT/JP2008/071502, mailed Feb. 24, 2009.

(Continued)

*Primary Examiner* — Allyson Trail
(74) *Attorney, Agent, or Firm* — Keating & Bennett, LLP

(57) ABSTRACT

In an antenna for an RFID device, a feed coil is coupled to a first booster coil and a second booster coil through an electromagnetic field. In the feed coil, a first region and a second region are disposed so as to overlap with the first booster coil and the second booster coil, respectively. The first region of the feed coil is coupled to the first booster coil through an electromagnetic field, and the second region of the feed coil is coupled to the second booster coil through an electromagnetic field. Accordingly, the antenna has a high degree of coupling between the feed coil and a booster antenna and superior transmission efficiency of an RF signal, and prevents the occurrence of a null point.

7 Claims, 11 Drawing Sheets

U.S. PATENT DOCUMENTS

| | | | |
|---|---|---|---|
| 5,936,150 | A | 8/1999 | Kobrin et al. |
| 5,955,723 | A | 9/1999 | Reiner |
| 5,995,006 | A | 11/1999 | Walsh |
| 6,104,611 | A | 8/2000 | Glover et al. |
| 6,107,920 | A | 8/2000 | Eberhardt et al. |
| 6,172,608 | B1 | 1/2001 | Cole |
| 6,181,287 | B1 | 1/2001 | Beigel |
| 6,190,942 | B1 | 2/2001 | Wilm et al. |
| 6,243,045 | B1 | 6/2001 | Ishibashi |
| 6,249,258 | B1 | 6/2001 | Bloch et al. |
| 6,259,369 | B1 | 7/2001 | Monico |
| 6,271,803 | B1 | 8/2001 | Watanabe et al. |
| 6,335,686 | B1 | 1/2002 | Goff et al. |
| 6,362,784 | B1 | 3/2002 | Kane et al. |
| 6,367,143 | B1 | 4/2002 | Sugimura |
| 6,378,774 | B1 | 4/2002 | Emori et al. |
| 6,406,990 | B1 | 6/2002 | Kawai |
| 6,448,874 | B1 | 9/2002 | Shiino et al. |
| 6,452,563 | B1 | 9/2002 | Porte |
| 6,462,716 | B1 | 10/2002 | Kushihi |
| 6,542,050 | B1 | 4/2003 | Arai et al. |
| 6,600,459 | B2 | 7/2003 | Yokoshima et al. |
| 6,634,564 | B2 | 10/2003 | Kuramochi |
| 6,664,645 | B2 | 12/2003 | Kawai |
| 6,763,254 | B2 | 7/2004 | Nishikawa |
| 6,812,707 | B2 | 11/2004 | Yonezawa et al. |
| 6,828,881 | B2 | 12/2004 | Mizutani et al. |
| 6,837,438 | B1 | 1/2005 | Takasugi et al. |
| 6,861,731 | B2 | 3/2005 | Buijsman et al. |
| 6,927,738 | B2 | 8/2005 | Senba et al. |
| 6,956,481 | B1 | 10/2005 | Cole |
| 6,963,729 | B2 | 11/2005 | Uozumi |
| 7,088,249 | B2 | 8/2006 | Senba et al. |
| 7,088,307 | B2 | 8/2006 | Imaizumi |
| 7,112,952 | B2 | 9/2006 | Arai et al. |
| 7,119,693 | B1 | 10/2006 | Devilbiss |
| 7,129,834 | B2 | 10/2006 | Naruse et al. |
| 7,248,221 | B2 | 7/2007 | Kai et al. |
| 7,250,910 | B2 | 7/2007 | Yoshikawa et al. |
| 7,276,929 | B2 | 10/2007 | Arai et al. |
| 7,317,396 | B2 | 1/2008 | Ujino |
| 7,405,664 | B2 | 7/2008 | Sakama et al. |
| 2002/0011967 | A1 | 1/2002 | Goff et al. |
| 2002/0015002 | A1 | 2/2002 | Yasukawa et al. |
| 2002/0044092 | A1 | 4/2002 | Kushihi |
| 2002/0067316 | A1 | 6/2002 | Yokoshima et al. |
| 2002/0093457 | A1 | 7/2002 | Hamada et al. |
| 2003/0006901 | A1 | 1/2003 | Kim et al. |
| 2003/0020661 | A1 | 1/2003 | Sato |
| 2003/0045324 | A1 | 3/2003 | Nagumo et al. |
| 2003/0169153 | A1 | 9/2003 | Muller |
| 2004/0001027 | A1 | 1/2004 | Killen et al. |
| 2004/0026519 | A1 | 2/2004 | Usami et al. |
| 2004/0056823 | A1 | 3/2004 | Zuk et al. |
| 2004/0066617 | A1 | 4/2004 | Hirabayashi et al. |
| 2004/0217915 | A1 | 11/2004 | Imaizumi |
| 2004/0219956 | A1 | 11/2004 | Iwai et al. |
| 2004/0227673 | A1 | 11/2004 | Iwai et al. |
| 2004/0252064 | A1 | 12/2004 | Yuanzhu |
| 2005/0092836 | A1 | 5/2005 | Kudo |
| 2005/0099337 | A1 | 5/2005 | Takei et al. |
| 2005/0125093 | A1 | 6/2005 | Kikuchi et al. |
| 2005/0134460 | A1 | 6/2005 | Usami |
| 2005/0134506 | A1 | 6/2005 | Egbert |
| 2005/0138798 | A1 | 6/2005 | Sakama et al. |
| 2005/0140512 | A1 | 6/2005 | Sakama et al. |
| 2005/0232412 | A1 | 10/2005 | Ichihara et al. |
| 2005/0236623 | A1 | 10/2005 | Takechi et al. |
| 2005/0275539 | A1 | 12/2005 | Sakama et al. |
| 2006/0001138 | A1 | 1/2006 | Sakama et al. |
| 2006/0032926 | A1 | 2/2006 | Baba et al. |
| 2006/0044192 | A1 | 3/2006 | Egbert |
| 2006/0055531 | A1 | 3/2006 | Cook et al. |
| 2006/0055601 | A1 | 3/2006 | Kameda et al. |
| 2006/0071084 | A1 | 4/2006 | Detig et al. |
| 2006/0109185 | A1 | 5/2006 | Iwai et al. |
| 2006/0145872 | A1 | 7/2006 | Tanaka et al. |
| 2006/0158380 | A1 | 7/2006 | Son et al. |
| 2006/0170606 | A1 | 8/2006 | Yamagajo et al. |
| 2006/0214801 | A1 | 9/2006 | Murofushi et al. |
| 2006/0220871 | A1 | 10/2006 | Baba et al. |
| 2006/0244568 | A1 | 11/2006 | Tong et al. |
| 2006/0244676 | A1 | 11/2006 | Uesaka |
| 2006/0267138 | A1 | 11/2006 | Kobayashi |
| 2007/0004028 | A1 | 1/2007 | Lair et al. |
| 2007/0018893 | A1 | 1/2007 | Kai et al. |
| 2007/0040028 | A1 | 2/2007 | Kawamata |
| 2007/0052613 | A1 | 3/2007 | Gallschuetz et al. |
| 2007/0057854 | A1 | 3/2007 | Oodachi et al. |
| 2007/0069037 | A1 | 3/2007 | Kawai |
| 2007/0132591 | A1 | 6/2007 | Khatri |
| 2007/0164414 | A1 | 7/2007 | Dokai et al. |
| 2007/0200782 | A1 | 8/2007 | Hayama et al. |
| 2007/0229276 | A1 | 10/2007 | Yamagajo et al. |
| 2007/0247387 | A1 | 10/2007 | Kubo et al. |
| 2007/0252700 | A1 | 11/2007 | Ishihara et al. |
| 2007/0252703 | A1 | 11/2007 | Kato et al. |
| 2007/0285335 | A1 | 12/2007 | Bungo et al. |
| 2007/0290928 | A1 | 12/2007 | Chang et al. |
| 2008/0024156 | A1 | 1/2008 | Arai et al. |
| 2008/0068132 | A1 | 3/2008 | Kayanakis et al. |
| 2008/0070003 | A1 | 3/2008 | Nakatani et al. |
| 2008/0087990 | A1 | 4/2008 | Kato et al. |
| 2008/0143630 | A1 | 6/2008 | Kato et al. |
| 2008/0169905 | A1 | 7/2008 | Slatter |
| 2008/0184281 | A1 | 7/2008 | Ashizaki et al. |
| 2008/0272885 | A1 | 11/2008 | Atherton |
| 2009/0002130 | A1 | 1/2009 | Kato |
| 2009/0009007 | A1 | 1/2009 | Kato et al. |
| 2009/0021352 | A1 | 1/2009 | Kataya et al. |
| 2009/0021446 | A1 | 1/2009 | Kataya et al. |
| 2009/0065594 | A1 | 3/2009 | Kato et al. |
| 2009/0109102 | A1 | 4/2009 | Dokai et al. |
| 2009/0160719 | A1* | 6/2009 | Kato et al. .................... 343/742 |
| 2009/0201116 | A1 | 8/2009 | Orihara |
| 2009/0224061 | A1 | 9/2009 | Kato et al. |
| 2009/0231106 | A1 | 9/2009 | Okamura |
| 2009/0262041 | A1 | 10/2009 | Ikemoto et al. |
| 2009/0266900 | A1 | 10/2009 | Ikemoto et al. |
| 2009/0278687 | A1 | 11/2009 | Kato |
| 2009/0321527 | A1 | 12/2009 | Kato et al. |
| 2010/0103058 | A1 | 4/2010 | Kato et al. |
| 2010/0182210 | A1 | 7/2010 | Ryou et al. |
| 2010/0308118 | A1 | 12/2010 | Kataya et al. |
| 2011/0031320 | A1 | 2/2011 | Kato et al. |
| 2011/0063184 | A1 | 3/2011 | Furumura et al. |

FOREIGN PATENT DOCUMENTS

| | | | |
|---|---|---|---|
| EP | 0 694 874 | A2 | 1/1996 |
| EP | 0 848 448 | A2 | 6/1998 |
| EP | 0 948 083 | A2 | 10/1999 |
| EP | 0 977 145 | A2 | 2/2000 |
| EP | 1 010 543 | A1 | 6/2000 |
| EP | 1 085 480 | A1 | 3/2001 |
| EP | 1 160 915 | A2 | 12/2001 |
| EP | 1 170 795 | A2 | 1/2002 |
| EP | 1 193 793 | A2 | 4/2002 |
| EP | 1 227 540 | A1 | 7/2002 |
| EP | 1 280 232 | A1 | 1/2003 |
| EP | 1 280 350 | A1 | 1/2003 |
| EP | 1 343 223 | A1 | 9/2003 |
| EP | 1 357 511 | A2 | 10/2003 |
| EP | 1 547 753 | A1 | 6/2005 |
| EP | 1 548 872 | A1 | 6/2005 |
| EP | 1 626 364 | A2 | 2/2006 |
| EP | 1 701 296 | A1 | 9/2006 |
| EP | 1 703 589 | A1 | 9/2006 |
| EP | 1 742 296 | A1 | 1/2007 |
| EP | 1 744 398 | A1 | 1/2007 |
| EP | 1 840 802 | A1 | 10/2007 |
| EP | 1 841 005 | A1 | 10/2007 |
| EP | 1 865 574 | A1 | 12/2007 |
| EP | 1 887 652 | A1 | 2/2008 |
| EP | 1 976 056 | A1 | 10/2008 |
| EP | 1 988 491 | A1 | 11/2008 |
| EP | 1 988 601 | A1 | 11/2008 |
| EP | 1 993 170 | A1 | 11/2008 |

| | | | |
|---|---|---|---|
| EP | 2 009 738 | A1 | 12/2008 |
| EP | 2 012 258 | A1 | 1/2009 |
| EP | 2 096 709 | A1 | 9/2009 |
| EP | 2 148 449 | A1 | 1/2010 |
| EP | 2 166 617 | A1 | 3/2010 |
| EP | 2 251 934 | A1 | 11/2010 |
| EP | 2 256 861 | A1 | 12/2010 |
| EP | 2 330 684 | A1 | 6/2011 |
| GB | 2 305 075 | A | 3/1997 |
| GB | 2461443 | A | 1/2010 |
| JP | 50-143451 | A | 11/1975 |
| JP | 61-284102 | A | 12/1986 |
| JP | 62-127140 | U | 8/1987 |
| JP | 01-212035 | A | 8/1989 |
| JP | 02-164105 | A | 6/1990 |
| JP | 02-256208 | A | 10/1990 |
| JP | 3-171385 | A | 7/1991 |
| JP | 03-503467 | A | 8/1991 |
| JP | 03-262313 | A | 11/1991 |
| JP | 04-150011 | A | 5/1992 |
| JP | 04-167500 | A | 6/1992 |
| JP | 04-096814 | U | 8/1992 |
| JP | 04-101168 | U | 9/1992 |
| JP | 04-134807 | U | 12/1992 |
| JP | 05-226926 | A | 9/1993 |
| JP | 05-327331 | A | 12/1993 |
| JP | 6-53733 | A | 2/1994 |
| JP | 06-077729 | A | 3/1994 |
| JP | 06-177635 | A | 6/1994 |
| JP | 6-260949 | A | 9/1994 |
| JP | 07-183836 | A | 7/1995 |
| JP | 08-055725 | A | 2/1996 |
| JP | 08-056113 | A | 2/1996 |
| JP | 8-87580 | A | 4/1996 |
| JP | 08-88586 | A | 4/1996 |
| JP | 08-088586 | A | 4/1996 |
| JP | 08-176421 | A | 7/1996 |
| JP | 08-180160 | A | 7/1996 |
| JP | 08-279027 | A | 10/1996 |
| JP | 08-307126 | A | 11/1996 |
| JP | 08-330372 | A | 12/1996 |
| JP | 09-014150 | A | 1/1997 |
| JP | 09-035025 | A | 2/1997 |
| JP | 9-93029 | A | 4/1997 |
| JP | 09-093029 | A | 4/1997 |
| JP | 09-245381 | A | 9/1997 |
| JP | 09-252217 | A | 9/1997 |
| JP | 09-270623 | A | 10/1997 |
| JP | 09-284038 | A | 10/1997 |
| JP | 9-512367 | A | 12/1997 |
| JP | 10-069533 | A | 3/1998 |
| JP | 10-69533 | A | 3/1998 |
| JP | 10-505466 | A | 5/1998 |
| JP | 10-171954 | A | 6/1998 |
| JP | 10-173427 | A | 6/1998 |
| JP | 10-193849 | A | 7/1998 |
| JP | 10-193851 | A | 7/1998 |
| JP | 10-293828 | A | 11/1998 |
| JP | 10-334203 | A | 12/1998 |
| JP | 11-025244 | A | 1/1999 |
| JP | 11-039441 | A | 2/1999 |
| JP | 11-075329 | A | 3/1999 |
| JP | 11-085937 | A | 3/1999 |
| JP | 11-88241 | A | 3/1999 |
| JP | 11-102424 | A | 4/1999 |
| JP | 11-103209 | A | 4/1999 |
| JP | 11-149536 | A | 6/1999 |
| JP | 11-149537 | A | 6/1999 |
| JP | 11-149538 | A | 6/1999 |
| JP | 11-175678 | A | 7/1999 |
| JP | 11-219420 | A | 8/1999 |
| JP | 11-220319 | A | 8/1999 |
| JP | 11-282993 | A | 10/1999 |
| JP | 11-328352 | A | 11/1999 |
| JP | 11-331014 | A | 11/1999 |
| JP | 11-346114 | A | 12/1999 |
| JP | 11-515094 | A | 12/1999 |
| JP | 2000-21128 | A | 1/2000 |
| JP | 2000-021639 | A | 1/2000 |

| | | | |
|---|---|---|---|
| JP | 2000-022421 | A | 1/2000 |
| JP | 2000-059260 | A | 2/2000 |
| JP | 2000-085283 | A | 3/2000 |
| JP | 2000-090207 | A | 3/2000 |
| JP | 2000-132643 | A | 5/2000 |
| JP | 2000-137778 | A | 5/2000 |
| JP | 2000-137779 | A | 5/2000 |
| JP | 2000-137785 | A | 5/2000 |
| JP | 2000-148948 | A | 5/2000 |
| JP | 2000-172812 | A | 6/2000 |
| JP | 2000-209013 | A | 7/2000 |
| JP | 2000-222540 | A | 8/2000 |
| JP | 2000-510271 | A | 8/2000 |
| JP | 2000-242754 | A | 9/2000 |
| JP | 2000-243797 | A | 9/2000 |
| JP | 2000-251049 | A | 9/2000 |
| JP | 2000-261230 | A | 9/2000 |
| JP | 2000-276569 | A | 10/2000 |
| JP | 2000-286634 | A | 10/2000 |
| JP | 2000-286760 | A | 10/2000 |
| JP | 2000-311226 | A | 11/2000 |
| JP | 2000-321984 | A | 11/2000 |
| JP | 2000-349680 | A | 12/2000 |
| JP | 2001-10264 | A | 1/2001 |
| JP | 2001-028036 | A | 1/2001 |
| JP | 2001-043340 | A | 2/2001 |
| JP | 3075400 | U | 2/2001 |
| JP | 2001-66990 | A | 3/2001 |
| JP | 2001-76111 | A | 3/2001 |
| JP | 2001-084463 | A | 3/2001 |
| JP | 2001-101369 | A | 4/2001 |
| JP | 2001-505682 | A | 4/2001 |
| JP | 2001-168628 | A | 6/2001 |
| JP | 2001-188890 | A | 7/2001 |
| JP | 2001-240046 | A | 9/2001 |
| JP | 2001-240217 | A | 9/2001 |
| JP | 2001-256457 | A | 9/2001 |
| JP | 2001-257292 | A | 9/2001 |
| JP | 2001-514777 | A | 9/2001 |
| JP | 2001-291181 | A | 10/2001 |
| JP | 2001-319380 | A | 11/2001 |
| JP | 2001-331976 | A | 11/2001 |
| JP | 2001-332923 | A | 11/2001 |
| JP | 2001-339226 | A | 12/2001 |
| JP | 2001-344574 | A | 12/2001 |
| JP | 2001-351083 | A | 12/2001 |
| JP | 2001-351084 | A | 12/2001 |
| JP | 2001-352176 | A | 12/2001 |
| JP | 2001-358527 | A | 12/2001 |
| JP | 2002-024776 | A | 1/2002 |
| JP | 2002-026513 | A | 1/2002 |
| JP | 2002-32731 | A | 1/2002 |
| JP | 2002-042076 | A | 2/2002 |
| JP | 2002-42083 | A | 2/2002 |
| JP | 2002-063557 | A | 2/2002 |
| JP | 2002-505645 | A | 2/2002 |
| JP | 2002-76750 | A | 3/2002 |
| JP | 2002-076750 | A | 3/2002 |
| JP | 2002-111363 | A | 4/2002 |
| JP | 2002-150245 | A | 5/2002 |
| JP | 2002-157564 | A | 5/2002 |
| JP | 2002-158529 | A | 5/2002 |
| JP | 2002-175508 | A | 6/2002 |
| JP | 2002-183676 | A | 6/2002 |
| JP | 2002-183690 | A | 6/2002 |
| JP | 2002-185358 | A | 6/2002 |
| JP | 2002-204117 | A | 7/2002 |
| JP | 2002-521757 | A | 7/2002 |
| JP | 2002-522849 | A | 7/2002 |
| JP | 2002-230128 | A | 8/2002 |
| JP | 2002-232221 | A | 8/2002 |
| JP | 2002-246828 | A | 8/2002 |
| JP | 2002-252117 | A | 9/2002 |
| JP | 2002-259934 | A | 9/2002 |
| JP | 2002-280821 | A | 9/2002 |
| JP | 2002-298109 | A | 10/2002 |
| JP | 2002-308437 | A | 10/2002 |
| JP | 2002-319008 | A | 10/2002 |
| JP | 2002-319009 | A | 10/2002 |

| | | | |
|---|---|---|---|
| JP | 2002-319812 | A | 10/2002 |
| JP | 2002-362613 | A | 12/2002 |
| JP | 2002-366917 | A | 12/2002 |
| JP | 2002-373029 | A | 12/2002 |
| JP | 2002-373323 | A | 12/2002 |
| JP | 2002-374139 | A | 12/2002 |
| JP | 2003-006599 | A | 1/2003 |
| JP | 2003-016412 | A | 1/2003 |
| JP | 2003-022912 | A | 1/2003 |
| JP | 2003-026177 | A | 1/2003 |
| JP | 2003-030612 | A | 1/2003 |
| JP | 2003-037861 | A | 2/2003 |
| JP | 2003-44789 | A | 2/2003 |
| JP | 2003-046318 | A | 2/2003 |
| JP | 2003-58840 | A | 2/2003 |
| JP | 2003-067711 | A | 3/2003 |
| JP | 2003-069335 | A | 3/2003 |
| JP | 2003-076947 | A | 3/2003 |
| JP | 2003-76963 | A | 3/2003 |
| JP | 2003-78333 | A | 3/2003 |
| JP | 2003-078336 | A | 3/2003 |
| JP | 2003-085501 | A | 3/2003 |
| JP | 2003-085520 | A | 3/2003 |
| JP | 2003-87008 | A | 3/2003 |
| JP | 2003-87044 | A | 3/2003 |
| JP | 2003-099184 | A | 4/2003 |
| JP | 2003-099720 | A | 4/2003 |
| JP | 2003-099721 | A | 4/2003 |
| JP | 2003-110344 | A | 4/2003 |
| JP | 2003-132330 | A | 5/2003 |
| JP | 2003-134007 | A | 5/2003 |
| JP | 2003-155062 | A | 5/2003 |
| JP | 2003-158414 | A | 5/2003 |
| JP | 2003-168760 | A | 6/2003 |
| JP | 2003-179565 | A | 6/2003 |
| JP | 2003-187207 | A | 7/2003 |
| JP | 2003-187211 | A | 7/2003 |
| JP | 2003-188338 | A | 7/2003 |
| JP | 2003-188620 | A | 7/2003 |
| JP | 2003-198230 | A | 7/2003 |
| JP | 2003-209421 | A | 7/2003 |
| JP | 2003-216919 | A | 7/2003 |
| JP | 2003-218624 | A | 7/2003 |
| JP | 2003-233780 | A | 8/2003 |
| JP | 2003-242471 | A | 8/2003 |
| JP | 2003-243918 | A | 8/2003 |
| JP | 2003-249813 | A | 9/2003 |
| JP | 2003-529163 | A | 9/2003 |
| JP | 2003-288560 | A | 10/2003 |
| JP | 2003-309418 | A | 10/2003 |
| JP | 2003-317060 | A | 11/2003 |
| JP | 2003-331246 | A | 11/2003 |
| JP | 2003-332820 | A | 11/2003 |
| JP | 2003-536302 | A | 12/2003 |
| JP | 2004-040597 | A | 2/2004 |
| JP | 2004-505481 | A | 2/2004 |
| JP | 2004-082775 | A | 3/2004 |
| JP | 2004-88218 | A | 3/2004 |
| JP | 2004-93693 | A | 3/2004 |
| JP | 2004-096566 | A | 3/2004 |
| JP | 2004-096618 | A | 3/2004 |
| JP | 2004-126750 | A | 4/2004 |
| JP | 2004-127230 | A | 4/2004 |
| JP | 2004-140513 | A | 5/2004 |
| JP | 2004-163134 | A | 6/2004 |
| JP | 2004-213582 | A | 7/2004 |
| JP | 2004-519916 | A | 7/2004 |
| JP | 2004-234595 | A | 8/2004 |
| JP | 2004-253858 | A | 9/2004 |
| JP | 2004-527864 | A | 9/2004 |
| JP | 2004-280390 | A | 10/2004 |
| JP | 2004-282403 | A | 10/2004 |
| JP | 2004-287767 | A | 10/2004 |
| JP | 2004-295297 | A | 10/2004 |
| JP | 2004-297249 | A | 10/2004 |
| JP | 2004-297681 | A | 10/2004 |
| JP | 2004-304370 | A | 10/2004 |
| JP | 2004-319848 | A | 11/2004 |
| JP | 2004-326380 | A | 11/2004 |

| | | | |
|---|---|---|---|
| JP | 2004-334268 | A | 11/2004 |
| JP | 2004-336250 | A | 11/2004 |
| JP | 2004-343000 | A | 12/2004 |
| JP | 2004-362190 | A | 12/2004 |
| JP | 2004-362341 | A | 12/2004 |
| JP | 2004-362602 | A | 12/2004 |
| JP | 2005-5866 | A | 1/2005 |
| JP | 2005-18156 | A | 1/2005 |
| JP | 2005-033461 | A | 2/2005 |
| JP | 2005-124061 | A | 5/2005 |
| JP | 2005-128592 | A | 5/2005 |
| JP | 2005-129019 | A | 5/2005 |
| JP | 2005-135132 | A | 5/2005 |
| JP | 2005-136528 | A | 5/2005 |
| JP | 2005-137032 | A | 5/2005 |
| JP | 3653099 | B2 | 5/2005 |
| JP | 2005-165839 | A | 6/2005 |
| JP | 2005-167327 | A | 6/2005 |
| JP | 2005-167813 | A | 6/2005 |
| JP | 2005-190417 | A | 7/2005 |
| JP | 2005-191705 | A | 7/2005 |
| JP | 2005-192124 | A | 7/2005 |
| JP | 2005-204038 | A | 7/2005 |
| JP | 2005-210223 | A | 8/2005 |
| JP | 2005-210680 | A | 8/2005 |
| JP | 2005-217822 | A | 8/2005 |
| JP | 2005-229474 | A | 8/2005 |
| JP | 2005-2106676 | A | 8/2005 |
| JP | 2005-236339 | A | 9/2005 |
| JP | 2005-244778 | A | 9/2005 |
| JP | 2005-252853 | A | 9/2005 |
| JP | 2005-275870 | A | 10/2005 |
| JP | 2005-284352 | A | 10/2005 |
| JP | 2005-284455 | A | 10/2005 |
| JP | 2005-293537 | A | 10/2005 |
| JP | 2005-295135 | A | 10/2005 |
| JP | 2005-311205 | A | 11/2005 |
| JP | 2005-321305 | A | 11/2005 |
| JP | 2005-322119 | A | 11/2005 |
| JP | 2005-335755 | A | 12/2005 |
| JP | 2005-340759 | A | 12/2005 |
| JP | 2005-345802 | A | 12/2005 |
| JP | 2005-346820 | A | 12/2005 |
| JP | 2005-352858 | A | 12/2005 |
| JP | 2006-013976 | A | 1/2006 |
| JP | 2006-13976 | A | 1/2006 |
| JP | 2006-025390 | A | 1/2006 |
| JP | 2006-031766 | A | 2/2006 |
| JP | 2006-033312 | A | 2/2006 |
| JP | 2006-39902 | A | 2/2006 |
| JP | 2006-039947 | A | 2/2006 |
| JP | 2006-42059 | A | 2/2006 |
| JP | 2006-42097 | A | 2/2006 |
| JP | 2006-050200 | A | 2/2006 |
| JP | 2006-053833 | A | 2/2006 |
| JP | 2006-67479 | A | 3/2006 |
| JP | 2006-72706 | A | 3/2006 |
| JP | 2006-074348 | A | 3/2006 |
| JP | 2006-80367 | A | 3/2006 |
| JP | 2006-92630 | A | 4/2006 |
| JP | 2006-102953 | A | 4/2006 |
| JP | 2006-107296 | A | 4/2006 |
| JP | 2006-513594 | A | 4/2006 |
| JP | 2006-148462 | A | 6/2006 |
| JP | 2006-148518 | A | 6/2006 |
| JP | 2006-151402 | A | 6/2006 |
| JP | 2006-174151 | A | 6/2006 |
| JP | 2006-195795 | A | 7/2006 |
| JP | 2006-203187 | A | 8/2006 |
| JP | 2006-203852 | A | 8/2006 |
| JP | 2006-217000 | A | 8/2006 |
| JP | 2006-232292 | A | 9/2006 |
| JP | 2006-237674 | A | 9/2006 |
| JP | 2006-238282 | A | 9/2006 |
| JP | 2006-246372 | A | 9/2006 |
| JP | 2006-270212 | A | 10/2006 |
| JP | 2006-270681 | A | 10/2006 |
| JP | 2006-270766 | A | 10/2006 |
| JP | 2006-285911 | A | 10/2006 |

| | | | |
|---|---|---|---|
| JP | 2006-287659 | A | 10/2006 |
| JP | 2006-295879 | A | 10/2006 |
| JP | 2006-302219 | A | 11/2006 |
| JP | 2006-309401 | A | 11/2006 |
| JP | 2006-311239 | A | 11/2006 |
| JP | 2006-323481 | A | 11/2006 |
| JP | 2006-339964 | A | 12/2006 |
| JP | 2007-007888 | A | 1/2007 |
| JP | 2007-13120 | A | 1/2007 |
| JP | 2007-18067 | A | 1/2007 |
| JP | 2007-019905 | A | 1/2007 |
| JP | 2007-28002 | A | 2/2007 |
| JP | 2007-040702 | A | 2/2007 |
| JP | 2007-043535 | A | 2/2007 |
| JP | 2007-048126 | A | 2/2007 |
| JP | 2007-65822 | A | 3/2007 |
| JP | 2007-79687 | A | 3/2007 |
| JP | 2007-81712 | A | 3/2007 |
| JP | 2007-096768 | A | 4/2007 |
| JP | 2007-102348 | A | 4/2007 |
| JP | 2007-116347 | A | 5/2007 |
| JP | 2007-122542 | A | 5/2007 |
| JP | 2007-150642 | A | 6/2007 |
| JP | 2007-150868 | A | 6/2007 |
| JP | 2007-159083 | A | 6/2007 |
| JP | 2007-159129 | A | 6/2007 |
| JP | 2007-166133 | A | 6/2007 |
| JP | 2007-172369 | A | 7/2007 |
| JP | 2007-172527 | A | 7/2007 |
| JP | 2007-228254 | A | 9/2007 |
| JP | 2007-228325 | A | 9/2007 |
| JP | 2007-233597 | A | 9/2007 |
| JP | 2007-266999 | A | 10/2007 |
| JP | 2007-272264 | A | 10/2007 |
| JP | 2007-287128 | A | 11/2007 |
| JP | 2007-295557 | A | 11/2007 |
| JP | 2007-312350 | A | 11/2007 |
| JP | 2007-324865 | A | 12/2007 |
| JP | 2008-033716 | A | 2/2008 |
| JP | 2008-042910 | A | 2/2008 |
| JP | 2008-72243 | A | 3/2008 |
| JP | 2008-083867 | A | 4/2008 |
| JP | 2008-097426 | A | 4/2008 |
| JP | 2008-098993 | A | 4/2008 |
| JP | 4069958 | B2 | 4/2008 |
| JP | 2008-103691 | A | 5/2008 |
| JP | 2008-107947 | A | 5/2008 |
| JP | 2008-513888 | A | 5/2008 |
| JP | 2008-148345 | A | 6/2008 |
| JP | 2008-519347 | A | 6/2008 |
| JP | 2008-160874 | A | 7/2008 |
| JP | 2008-167190 | A | 7/2008 |
| JP | 2008-197714 | A | 8/2008 |
| JP | 2008-535372 | A | 8/2008 |
| JP | 2008-207875 | A | 9/2008 |
| JP | 2008-217406 | A | 9/2008 |
| JP | 2008-288915 | A | 11/2008 |
| JP | 2009-017284 | A | 1/2009 |
| JP | 2009-021970 | A | 1/2009 |
| JP | 2009-25870 | A | 2/2009 |
| JP | 2009-27291 | A | 2/2009 |
| JP | 2009-044647 | A | 2/2009 |
| JP | 2009-044715 | A | 2/2009 |
| JP | 3148168 | U | 2/2009 |
| JP | 2009-110144 | A | 5/2009 |
| JP | 2009-153166 | A | 7/2009 |
| JP | 2009-182630 | A | 8/2009 |
| JP | 2009-213169 | A | 9/2009 |
| JP | 2010-050844 | A | 3/2010 |
| JP | 2010-081571 | | 4/2010 |
| JP | 4609604 | B2 | 1/2011 |
| NL | 9100176 | A | 3/1992 |
| NL | 9100347 | A | 3/1992 |
| WO | 98/33142 | A1 | 7/1998 |
| WO | 99/67754 | A1 | 12/1999 |
| WO | 00/10122 | A2 | 2/2000 |
| WO | 01/95242 | A2 | 12/2001 |
| WO | 02/48980 | A1 | 6/2002 |
| WO | 02/061675 | A1 | 8/2002 |
| WO | 02/097723 | A1 | 12/2002 |
| WO | 03/079305 | A1 | 9/2003 |
| WO | 2004/036772 | A2 | 4/2004 |
| WO | 2004/070879 | A | 8/2004 |
| WO | 2004/072892 | A2 | 8/2004 |
| WO | 2005/073937 | A | 8/2005 |
| WO | 2005/091434 | A1 | 9/2005 |
| WO | 2005/115849 | A1 | 12/2005 |
| WO | 2006/045682 | A | 5/2006 |
| WO | 2006/048663 | A1 | 5/2006 |
| WO | 2006/114821 | A1 | 11/2006 |
| WO | 2007/083574 | A1 | 7/2007 |
| WO | 2007/083575 | A1 | 7/2007 |
| WO | 2007/086130 | A1 | 8/2007 |
| WO | 2007/094494 | A1 | 8/2007 |
| WO | 2007/097385 | A1 | 8/2007 |
| WO | 2007/102360 | A1 | 9/2007 |
| WO | 2007/105348 | A1 | 9/2007 |
| WO | 2007/119310 | A1 | 10/2007 |
| WO | 2007/125683 | A1 | 11/2007 |
| WO | 2007/132094 | A1 | 11/2007 |
| WO | 2007/138857 | A1 | 12/2007 |
| WO | 2008/007606 | A | 1/2008 |
| WO | 2008/081699 | A1 | 7/2008 |
| WO | 2008/126458 | A1 | 10/2008 |
| WO | 2008/133018 | A1 | 11/2008 |
| WO | 2008/140037 | A1 | 11/2008 |
| WO | 2008/142957 | A1 | 11/2008 |
| WO | 2009/008296 | A1 | 1/2009 |
| WO | 2009/011144 | A1 | 1/2009 |
| WO | 2009/011376 | A1 | 1/2009 |
| WO | 2009/011400 | A1 | 1/2009 |
| WO | 2009/011423 | A1 | 1/2009 |
| WO | 2009/081719 | A1 | 7/2009 |
| WO | 2009/110381 | A1 | 9/2009 |
| WO | 2009/119548 | A1 | 10/2009 |
| WO | 2009/128437 | A1 | 10/2009 |
| WO | 2010/026939 | A1 | 3/2010 |

OTHER PUBLICATIONS

Kato et al.: "Wireless IC Device and Manufacturing Method Thereof," U.S. Appl. No. 12/432,854, filed Apr. 30, 2009.

Official communication issued in counterpart International Application No. PCT/JP2008/058168, mailed Aug. 12, 2008.

Official communication issued in counterpart International Application No. PCT/JP2008/062886, mailed Oct. 21, 2008.

Kato et al.: "Wireless IC Device," U.S. Appl. No. 12/469,896, filed May 21, 2009.

Ikemoto et al.: "Wireless IC Device," U.S. Appl. No. 12/496,709, filed Jul. 2, 2009.

Official communication issued in counterpart International Application No. PCT/JP2008/062947, mailed Aug. 19, 2008.

Official communication issued in counterpart International Application No. PCT/JP2008/056026, mailed Jul. 1, 2008.

Ikemoto et al.: "Wireless IC Device and Electronic Apparatus," U.S. Appl. No. 12/503,188; filed Jul. 15, 2009.

Official communication issued in counterpart International Application No. PCT/JP2008/055567, mailed May 20, 2008.

Official communication issued in counterpart International Application No. PCT/JP2008/051853, mailed Apr. 22, 2008.

Official communication issued in counterpart International Application No. PCT/JP2008/057239, mailed Jul. 22, 2008.

Kimura et al.: "Wireless IC Device," U.S. Appl. No. 121510,338, filed Jul. 28, 2009.

Kato et al.: "Wireless IC Device," U.S. Appl. No. 12/510,340, filed Jul. 28, 2009.

Kato: "Wireless IC Device," U.S. Appl. No. 12/510,344, filed Jul. 28, 2009.

Kato et al.: "Wireless IC Device," U.S. Appl. No. 12/510,347, filed Jul. 28, 2009.

Official communication issued in counterpart European Application No. 08 77 7758, dated on Jun. 30, 2009.

Official communication issued in counterpart Japanese Application No. 2008-103741, mailed on May 26, 2009.

Official communication issued in counterpart Japanese Application No. 2008-103742, mailed on May 26, 2009.
Official communication issued in International Application No. PCT/JP2008/050358, mailed on Mar. 25, 2008.
Official communication issued in International Application No. PCT/JP2008/050356, mailed on Mar. 25, 2008.
Osamura et al.: "Packaging Material With Electromagnetic Coupling Module," U.S. Appl. No. 12/536,663, filed Aug. 6, 2009.
Osamura et al.: "Packaging Material With Electromagnetic Coupling Module," U.S. Appl. No. 12/536,669, filed Aug. 6, 2009.
Dokai et al.: "Wireless IC Device and Component for Wireless IC Device," U.S. Appl. No. 12/543,553, filed Aug. 19, 2009.
Shioya et al.: "Wireless IC Device," U.S. Appl. No. 12/551,037, filed Aug. 31, 2009.
Ikemoto: "Wireless IC Device and Manufacturing Method Thereof," U.S. Appl. No. 12/579,672, filed Oct. 15, 2009.
Official communication issued in International Application No. PCT/JP2008/058614, mailed on Jun. 10, 2008.
Official Communication issued in International Patent Application No. PCT/JP2009/056934, mailed on Jun. 30, 2009.
Kato et al.: "Wireless IC Device"; U.S. Appl. No. 12/903,242, filed Oct. 13, 2010.
Kato et al.: "Wireless IC Device"; U.S. Appl. No. 12/940,103, filed Nov. 5, 2010.
Kato et al.: "Wireless IC Device System and Method of Determining Authenticity of Wireless IC Device"; U.S. Appl. No. 12/940,105, filed Nov. 5, 2010.
Official Communication issued in International Patent Application No. PCT/JP2009/059669, mailed on Aug. 25, 2009.
Official Communication issued in International Patent Application No. PCT/JP2009/062181, mailed on Oct. 13, 2009.
Official Communication issued in corresponding Japanese Application No. 2010-501323, mailed on Apr. 6, 2010.
Kato et al.: "Component of Wireless IC Device and Wireless IC Device"; U.S. Appl. No. 12/944,099, filed Nov. 11, 2010.
Kato et al.: Wireless IC Device and Manufacturing Method Thereof; U.S. Appl. No. 12/961,599, filed Dec. 7, 2010.
Kataya et al.: "Radio Frequency IC Device and Electronic Apparatus"; U.S. Appl. No. 12/959,454, filed Dec. 3, 2010.
Ikemoto et al.:"Radio IC Device"; U.S. Appl. No. 12/981,582, filed Dec. 30, 2010.
Official Communication issued in International Patent Application No. PCT/JP2009/062801, mailed on Oct. 27, 2009.
Ikemoto et al.: "Wireless IC Device and Electronic Apparatus"; U.S. Appl. No. 13/022,695, filed Feb. 8, 2011.
Official Communication issued in International Patent Application No. PCT/JP2009/067778, mailed on Jan. 26, 2010.
Kato: "Wireless IC Device and Method for Manufacturing Same"; U.S. Appl. No. 13/022,693, filed Feb. 8, 2011.
Kato: "Wireless IC Device"; U.S. Appl. No. 13/080,781, filed Apr. 6, 2011.
Official Communication issued in International Patent Application No. PCT/JP2009/066336, mailed on Dec. 22, ' 2009.
Official Communication issued in corresponding Japanese Patent Application No. 2010-509439, mailed on Jul. 6, 2010.
Official Communication issued in corresponding Japanese Patent Application No. 2011-032311, mailed on Mar. 29, 2011.
Official Communication issued in corresponding Japanese Patent Application No. 2009-525327, drafted on Sep. 22, 2010.
Official Communication issued in corresponding Japanese Patent Application No. 2011-032311, mailed on Aug. 2, 2011.
Official Communication issued in corresponding Japanese Patent Application No. 2011-032312, mailed on Aug. 2, 2011.
Official Communication issued in corresponding Japanese Patent Application No. 2011-032311, mailed on Aug. 23, 2001.
Kato et al.: "Wireless IC Device Component and Wireless IC Device"; U.S. Appl. No. 13/241,823, filed Sep. 23, 2011.
Kato et al.: "Antenna Device and Method of Setting Resonant Frequency of Antenna Device"; U.S. Appl. No. 13/272,365, filed Oct. 13, 2011.
Official Communication issued in International Patent Application No. PCT/JP2010/056812, mailed on Jul. 13, 2010.
Dokai et al.: "Optical Disc"; U.S. Appl. No. 13/295,153, filed Nov. 14, 2011.
Official Communication issued in International Patent Application No. PCT/JP2010/057668, mailed on Aug. 17, 2010.
Osamura et al.: "Radio Frequency IC Device and Method of Manufacturing the Same"; U.S. Appl. No. 13/308,575, filed Dec. 1, 2011.
Official Communication issued in International Patent Application No. PCT/JP2010/069417, mailed on Dec. 7, 2010.
Kato: "Wireless IC Device and Coupling Method for Power Feeding Circuit and Radiation Plate"; U.S. Appl. No. 13/325,273, filed Dec. 14, 2011.
Official Communication issued in International Patent Application No. PCT/JP2010/053496, mailed on Jun. 1, 2010.
Ikemoto: "Wireless IC Tag, Reader-Writer, and Information Processing System"; U.S. Appl. No. 13/329,354, filed Dec. 19, 2011.
Kato et al.: "Antenna and Antenna Module"; U.S. Appl. No. 13/334,462, filed Dec. 22, 2011.
Official Communication issued in International Patent Application No. PCT/JP2010/069418, mailed on Feb. 8, 2011.
Official Communication issued in International Patent Application No. PCT/JP2010/063082, mailed on Nov. 16, 2010.
Ikemoto: "Communication Terminal and Information Processing System"; U.S. Appl. No. 13/412,772, filed Mar. 6, 2012.
"Antenna Engineering Handbook", The Institute of Electronics and Communication Engineers, Mar. 5, 1999, pp. 20-21.
Official Communication issued in International Patent Application No. PCT/JP2010/066714, mailed on Dec. 14, 2010.
Nomura et al.: "Antenna and Wireless IC Device"; U.S. Appl. No. 13/419,454, filed Mar. 14, 2012.
Official Communication issued in International Patent Application No. PCT/JP2010/070607, mailed on Feb. 15, 2011.
Ito: "Wireless IC Device and Method of Detecting Environmental State Using the Device"; U.S. Appl. No. 13/421,889, filed Mar. 16, 2012.
Official Communication issued in International Patent Application No. PCT/JP2011/053654, mailed on Mar. 29, 2011.
Kato et al.: "Antenna Device and Mobile Communication Terminal"; U.S. Appl. No. 13/425,505, filed Mar. 21, 2012.
Official Communication issued in International Patent Application No. PCT/JP2010/069416, mailed on Feb. 8, 2011.
Kato et al.: "Wireless Communication Device and Metal Article"; U.S. Appl. No. 13/429,465, filed Mar. 26, 2012.
Official Communication issued in International Patent Application No. PCT/JP2011/055344, mailed on Jun. 14, 2011.
Kubo et al.: "Antenna and Mobile Terminal"; U.S. Appl. No. 13/452,972, filed Apr. 23, 2012.
Ikemoto: "RFID System"; U.S. Appl. No. 13/457,525, filed Apr. 27, 2012.
Ikemoto et al.: "Wireless IC Device and Electronic Apparatus"; U.S. Appl. No. 13/468,058, filed May 10, 2012.
Official Communication issued in International Patent Application No. PCT/JP2011/065431, mailed on Oct. 18, 2011.
Kato et al.: "Wireless IC Device"; U.S. Appl. No. 13/470,486, filed May 14, 2012.
Official Communication issued in International Patent Application No. PCT/JP2009/069486, mailed on Mar. 2, 2010.
Kato: "Radio IC Device"; U.S. Appl. No. 13/080,775, filed Apr. 6, 2011.
Kato et al.: "Antenna and Wireless IC Device"; U.S. Appl. No. 13/083,626, filed Apr. 11, 2011.
Official Communication issued in International Patent Application No. PCT/JP2009/070617, mailed on Mar. 16, 2010.
Nagai, "Mounting Technique of RFID by Roll-To-Roll Process", Material Stage, Technical Information Institute Co., Ltd, vol. 7, No. 9, 2007, pp. 4-12.
Dokai et al.: "Wireless IC Device"; U.S. Appl. No. 13/088,480, filed Apr. 18, 2011.
Kato et al.: "High-Frequency Device and Wireless IC Device"; U.S. Appl. No. 13/094,928, filed Apr. 27, 2011.
Dokai et al.: "Wireless IC Device"; U.S. Appl. No. 13/099,392, filed May 3, 2011.
Kato et al.: "Radio Frequency IC Device"; U.S. Appl. No. 13/163,803, filed Jun. 20, 2011.

Official Communication issued in International Patent Application No. PCT/JP2010/050170, mailed on Apr. 13, 2010.
Official Communication issued in International Patent Application No. PCT/JP2010/051205, mailed on May 11, 2010.
Kato: "Wireless IC Device, Wireless IC Module and Method of Manufacturing Wireless IC Module"; U.S. Appl. No. 13/169,067, filed Jun. 27, 2011.
Kato et al.: "Antenna and Wireless IC Device"; U.S. Appl. No. 13/190,670, filed Jul. 26, 2011.
Shiroki et al.: "RFIC Chip Mounting Structure"; U.S. Appl. No. 13/223,429, filed Sep. 1, 2011.
Official Communication issued in International Patent Application No. PCT/JP2010/056559, mailed on Jul. 27, 2010.
Taniguchi et al.: "Antenna Device and Radio Frequency IC Device"; U.S. Appl. No. 13/232,102, filed Sep. 14, 2011.
Official Communication issued in International Patent Application No. PCT/JP2008/063025, mailed on Aug. 12, 2008.
Kato et al.: "Wireless IC Device," U.S. Appl. No. 12/603,608, filed Oct. 22, 2009.
Kato et al.: "Wireless IC Device," U.S. Appl. No. 12/688,072, filed Jan. 15, 2010.
Official Communication issued in International Patent Application No. PCT/JP2009/053693, mailed on Jun. 9, 2009.
Kato: "Composite Antenna," U.S. Appl. No. 12/845,846, filed Jul. 29, 2010.
Official Communication issued in International Patent Application No. PCT/JP2009/053690, mailed on Jun. 2, 2009.
Kato et al.: "Radio Frequency IC Device and Radio Communication System," U.S. Appl. No. 12/859,340, filed Aug. 19, 2010.
Official Communication issued in International Patent Application No. PCT/JP2009/055758, mailed on Jun. 23, 2009.
Kato et al.: "Wireless IC Device," U.S. Appl. No. 12/859,880, filed Aug. 20, 2010.
Official Communication issued in International Patent Application No. PCT/JP2009/057482, mailed on Jul. 21, 2009.
Kataya et al.: "Wireless IC Device, Electronic Apparatus, and Method for Adjusting Resonant Frequency of Wireless IC Device," U.S. Appl. No. 12/861,945, filed Aug. 24, 2010.
Kato: "Wireless IC Device and Electromagnetic Coupling Module," U.S. Appl. No. 12/890,895, filed Sep. 27, 2010.
Official Communication issued in International Patent Application No. PCT/JP2009/059410, mailed on Aug. 4, 2009.
Kato et al.: "Wireless IC Device" U.S. Appl. No. 12/902,174, filed Oct. 12, 2010.
Official Communication issued in International Patent Application No. PCT/JP2009/059259, mailed on Aug. 11, 2009.
Official Communication issued in corresponding Japanese Patent Application No. 2010-506742, mailed on Apr. 6, 2010.
Official Communication issued in International Patent Application No. PCT/JP2009/056698, mailed on Jul. 7, 2009.
Official Communication issued in International Application No. PCT/JP2007/066007, mailed on Nov. 27, 2007.
Dokai et al.: "Wireless IC Device and Component for Wireless IC Device"; U.S. Appl. No. 12/359,690, filed Jan. 26, 2009.
Dokai et al.: "Test System for Radio Frequency IC Devices and Method of Manufacturing Radio Frequency IC Devices Using the Same"; U.S. Appl. No. 12/388,826, filed Feb. 19, 2009.
Official Communication issued in International Application No. PCT/JP2008/061955, mailed on Sep. 30, 2008.
Official Communication issued in International Application No. PCT/JP2007/066721, mailed on Nov. 27, 2007.
Official Communication issued in International Application No. PCT/JP2007/070460, mailed on Dec. 11, 2007.
Kato et al.: "Wireless IC Device"; U.S. Appl. No. 12/390,556, filed Feb. 23, 2009.
Kato et al.: "Inductively Coupled Module and Item With Inductively Coupled Module"; U.S. Appl. No. 12/398,497, filed Mar. 5, 2009.
Official Communication issued in International Patent Application No. PCT/JP2008/050945, mailed on May 1, 2008.
Kato et al.: "Article Having Electromagnetic Coupling Module Attached Thereto"; U.S. Appl. No. 12/401,767, filed Mar. 11, 2009.
Taniguchi et al.: "Antenna Device and Radio Frequency IC Device"; U.S. Appl. No. 12/326,117, filed Dec. 2, 2008.
Official Communication issued in International Patent Application No. PCT/JP2008/061442, mailed on Jul. 22, 2008.
Kato et al.: "Container With Electromagnetic Coupling Module"; U.S. Appl. No. 12/426,369, filed Apr. 20, 2009.
Kato: "Wireless IC Device"; U.S. Appl. No. 12/429,346, filed Apr. 24, 2009.
Official communication issued in Japanese Application No. 2007-531524, mailed on Sep. 11, 2007.
Official communication issued in Japanese Application No. 2007-531525, mailed on Sep. 25, 2007.
Official communication issued in Japanese Application No. 2007-531524, mailed on Dec. 12, 2007.
Official communication issued in European Application No. 07706650.4, mailed on Nov. 24, 2008.
Mukku-Sha, "Musen IC Tagu Katsuyo-no Subete" "(All About Wireless IC Tags"), RFID, pp. 112-126.
Dokai et al.: "Wireless IC Device and Component for Wireless IC Device"; U.S. Appl. No. 11/624,382, filed Jan. 18, 2007.
Dokai et al.: "Wireless IC Device, and Component for Wireless IC Device"; U.S. Appl. No. 11/930,818, filed Oct. 31, 2007.
Kato et al.: "Wireless IC Device"; U.S. Appl. No. 12/042,399, filed Mar. 5, 2008.
Official communication issued in related U.S. Appl. No. 12/042,399; mailed on Aug. 25, 2008.
English translation of NL9100176, published on Mar. 2, 1992.
English translation of NL9100347, published on Mar. 2, 1992.
Kato et al.: "Antenna"; U.S. Appl. No. 11/928,502, filed Oct. 30, 2007.
Kato et al.: "Wireless IC Device"; U.S. Appl. No. 12/211,117, filed Sep. 16, 2008.
Kato et al.: "Antenna"; U.S. Appl. No. 11/688,290, filed Mar. 20, 2007.
Kato et al.: "Electromagnetic-Coupling-Module-Attached Article"; U.S. Appl. No. 11/740,509, filed Apr. 26, 2007.
Kato et al.: "Product Including Power Supply Circuit Board"; U.S. Appl. No. 12/234,949, filed Sep. 22, 2008.
Kato et al.: "Data Coupler"; U.S. Appl. No. 12/252,475, filed Oct. 16, 2008.
Kato et al.; "Information Terminal Device"; U.S. Appl. No. 12/267,666, filed Nov. 10, 2008.
Kato et al.: "Wireless IC Device and Wireless IC Device Composite Component"; U.S. Appl. No. 12/276,444, filed Nov. 24, 2008.
Dokai et al.: "Optical Disc"; U.S. Appl. No. 12/326,916, filed Dec. 3, 2008.
Dokai et al.: "System for Inspecting Electromagnetic Coupling Modules and Radio IC Devices and Method for Manufacturing Electromagnetic Coupling Modules and Radio IC Devices Using the System"; U.S. Appl. No. 12/274,400, filed Nov. 20, 2008.
Kato: "Wireless IC Device"; U.S. Appl. No. 11/964,185, filed Dec. 26, 2007.
Kato et al.: "Radio Frequency IC Device"; U.S. Appl. No. 12/336,629, filed Dec. 17, 2008.
Kato et al.: "Wireless IC Device and Component for Wireless IC Device"; U.S. Appl. No. 12/339,198, filed Dec. 19, 2008.
Ikemoto et al.: "Wireless IC Device"; U.S. Appl. No. 11/851,651, filed Sep. 7, 2007.
Kataya et al.: "Wireless IC Device and Electronic Device"; U.S. Appl. No. 11/851,661, filed Sep. 7, 2007.
Dokai et al.: "Antenna and Radio IC Device"; U.S. Appl. No. 12/350,307, filed Jan. 8, 2009.
Official Communication issued in International Patent Application No. PCT/JP2010/066291, mailed on Dec. 28, 2010.
Ikemoto: "Communication Terminal and Information Processing System"; U.S. Appl. No. 13/432,002, filed Mar. 28, 2012.

* cited by examiner

ANTENNA AND RFID DEVICE

BACKGROUND OF THE INVENTION

1. Field of the Invention

The present invention relates to an antenna preferably for use in a wireless communication system such as an RFID (Radio Frequency Identification) system, and an RFID device including the antenna, and, in particular, relates to an antenna and an RFID device, applied to an RFID system of an HF band.

2. Description of the Related Art

In recent years, as a wireless communication system for performing information management of articles, an RFID system has been put to practical use, the RFID system establishing communication between a reader/writer generating an induction magnetic field and an RFID tag attached to an article on the basis of a non-contact method utilizing an electromagnetic field, and transmitting predetermined information. Here, the RFID tag includes an RFIC chip storing therein predetermined information and processing a predetermined RF signal and an antenna transmitting and receiving the RF signal.

For example, in Japanese Unexamined Patent Application Publication No. 2002-042083, an RFID tag utilizing a booster coil is disclosed. FIG. 1 is a plan view illustrating the arrangement of the booster coil and an IC device, included in the RFID tag. This RFID tag includes an RFIC 2 in which an antenna coil is integrally formed, an insulating member 6 in which a booster coil 3 and conductor films 4*a* and 4*b* used for electrostatic capacitance connection are provided, and a substrate integrally encasing these elements. In the RFIC 2, a rectangular spiral-shaped antenna coil is integrally formed, and the antenna coil is mounted so as to face the booster coil forming surface side of the insulating member 6.

On the back surface of the insulating member 6, conductor films 5*a* and 5*b*, which are used for electrostatic capacitance connection and face the conductor films 4*a* and 4*b*, are provided. In addition, as described above, the conductor films 4*a* and 4*b*, which are used for electrostatic capacitance connection and provided on the front surface side of the insulating member 6, are electrically connected through the booster coil 3, and the conductor films, which are used for electrostatic capacitance connection and formed on the back surface side of the insulating member 6, are electrically connected through a conductive wire.

In this RFID tag, the antenna coil of the RFIC 2 and the booster coil 3 are electromagnetic-field-coupled to each other, and a signal is transmitted between the RFIC 2 and the booster coil 3.

However, since, in such an RFID tag as illustrated in FIG. 1, the antenna coil has the same size as that of the RFIC chip and the booster coil has a card size, the sizes of both coils are significantly different from each other. Therefore, it is difficult to enhance the degree of coupling between the antenna coil and the booster coil. In addition, while, in Japanese Unexamined Patent Application Publication No. 2002-042083, a structure is disclosed in which the shape of a portion that is included in the booster coil and in which the RFIC chip is mounted, is turned into a shape closely related to the antenna coil, thereby enhancing the degree of coupling between the antenna coil on an RFIC chip side and the booster coil, the shape of the booster coil tends to become complex and the outside dimension of the booster coil tends to become large, in this structure.

In addition, in the antenna including the antenna coil and the booster coil, usually there occurs a situation where magnetic fluxes passing through a region in which the antenna coil and the booster coil overlap with each other or the vicinity of the region, cancel each other out. Also in the antenna illustrated in FIG. 1, for example, while each of magnetic fluxes B0 and B1 passes through the antenna coil and the booster coil in a same direction, a magnetic flux B2 passes through the antenna coil and the booster coil in an opposite direction. Therefore, in some cases, there occurs a null point at which a magnetic field formed owing to the antenna coil and a magnetic field formed owing to the booster coil cancel each other out. At this null point, it is hard to perform reading and writing.

SUMMARY OF THE INVENTION

Accordingly, preferred embodiments of the present invention provide an antenna that has a high degree of coupling between a feed coil and a booster antenna and superior transmission efficiency of an RF signal and also prevents the occurrence of a null point, and also provide an RFID device including the antenna.

An antenna according to a preferred embodiment of the present invention includes a booster antenna including a first booster coil and a second booster coil, and a feed coil coupled to the booster antenna, wherein the first booster coil and the second booster coil are connected in series, the first booster coil and the second booster coil are adjacent to each other, the feed coil is disposed so as to overlap with a position at which the first booster coil and the second booster coil are adjacent to each other, and a winding direction of the second booster coil with respect to the first booster coil is a direction in which the feed coil is coupled to the first booster coil and the second booster coil in a same phase through an electromagnetic field.

According to this configuration, the antenna achieves a high degree of coupling between the feed coil and the booster antenna and superior transmission efficiency of an RF signal.

When a structure is adopted in which the first booster coil and the second booster coil are disposed so as to be laminated in a plurality of layers, it is possible to enhance the degree of coupling between the booster antenna and the feed coil while also downsizing the feed coil with respect to the booster antenna.

In addition, when at least one of a pair of the first booster coils adjacent to each other in a layer direction and a pair of the second booster coils adjacent to each other in a layer direction is coupled through capacitance, it is not necessary to form a via electrode, for example, it is possible to simplify the configuration, and manufacturing is easy.

It is desirable that a distance from an inner circumference of the first booster coil to an inner circumference of the second booster coil in a portion in which the first booster coil and the second booster coil are adjacent to each other is larger than a width of an outer circumference of the feed coil. According to this configuration, it is possible to prevent the occurrence of a null point.

It is desirable that a distance between the first booster coil and the second booster coil is greater than conductor spacing in the first booster coil and the second booster coil. Accordingly, a difference between the resonance frequency and the antiresonance frequency of the antenna is widened and a gentle resonance characteristic is obtained. Therefore, the deviation of a center frequency due to the degree of magnetic coupling to a communication partner (e.g., a reader antenna) becomes small, and as a result, a change in a reading distance becomes small.

A resonance frequency of the feed coil or a resonance frequency of a circuit based on the feed coil and a feed circuit connected to the feed coil is made higher than a resonance frequency of the booster antenna. According to this configuration, the feed coil and the booster antenna are magnetic-field-coupled to each other, and hence it is possible to enhance the degree of coupling between the feed coil and the booster antenna. In addition, it is also possible to perform communication between the booster antenna and the reader/writer antenna through a magnetic field.

In addition, an RFID device according to another preferred embodiment of the present invention includes the antenna according to the preferred embodiment of the present invention described above and a feed circuit connected to the feed coil thereof, wherein the feed circuit includes an RFIC.

According to various preferred embodiments of the present invention, it is possible to provide an antenna that has a high degree of coupling between a feed coil and a booster antenna and superior transmission efficiency of an RF signal and prevents the occurrence of a null point, and an RFID device including the antenna.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
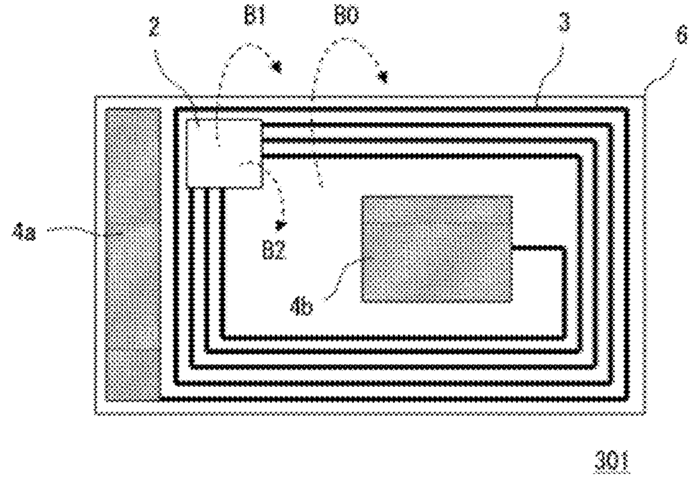
FIG. 1 PRIOR ART
FIG. 1 is a plan view illustrating arrangement of a booster coil and an IC device, included in an RFID tag of the related art.
Figure 2:
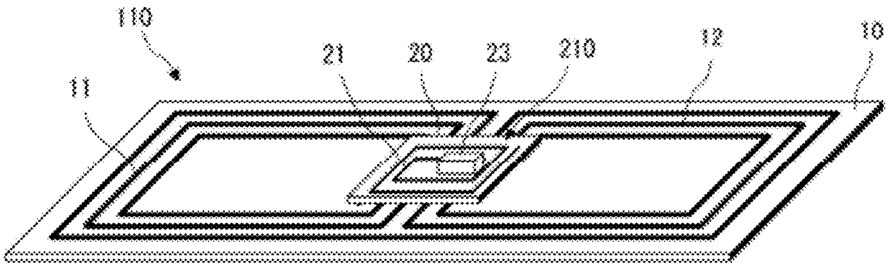
FIG. 2 is a perspective view of an RFID device 301 according to a first preferred embodiment of the present invention.
Figure 3:
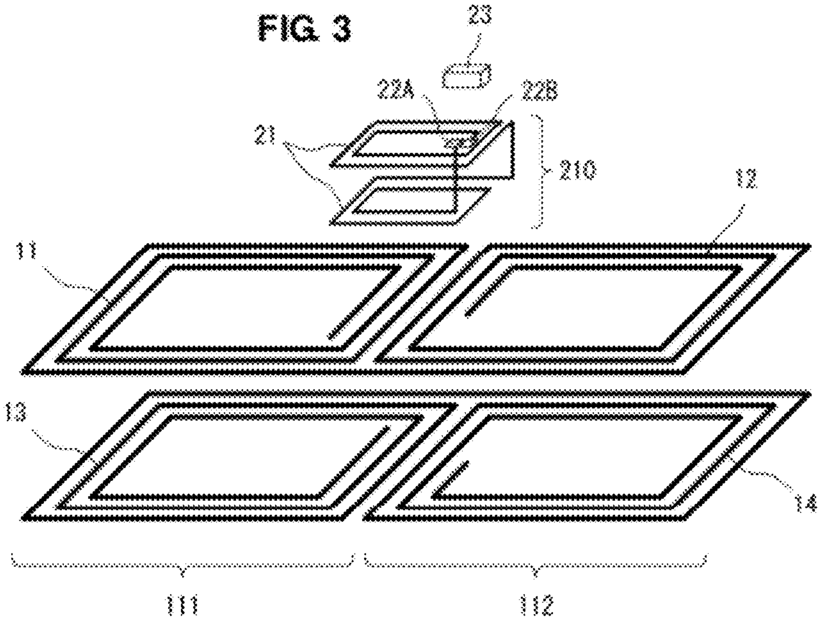
FIG. 3 is an exploded perspective view of a portion other than a base material of a feed antenna and a base material of a booster antenna.

FIG. 2 is the perspective view of an RFID device 301 according to a first preferred embodiment of the present invention. FIG. 3 is the exploded perspective view of a portion other than the base material of a feed antenna and the base material of a booster antenna. This RFID device 301 is preferably used as an RFID tag used for an RFID system of an HF band. For example, the RFID device 301 may preferably be included in a portable electronic device.

As illustrated in FIG. 2, the RFID device 301 includes an RFIC chip 23, a feed antenna 210 connected to the RFIC chip 23, and a booster antenna 110 coupled to the feed antenna 210.

The RFIC chip 23 preferably is an IC chip used for RFID, includes a memory circuit, a logic circuit, a clock circuit, and the like, and is preferably configured as an integrated circuit chip processing an RF signal.

The feed antenna 210 includes a feed antenna base material 20, a feed coil 21, and an RFIC chip 23. In the feed coil 21, rectangular spiral-shaped conductor patterns of a plurality of turns are provided in a plurality of layers. The rectangular spiral-shaped conductor patterns of the plural layers are connected through an interlayer connection conductor so that the directions of induced currents generated owing to the passage of magnetic fluxes in a same direction are aligned in a same direction. Both end portions of the feed coil 21 are input-output electrodes 22A and 22B, and the RFIC chip 23 is connected to the input-output electrodes 22A and 22B.

The booster antenna 110 preferably includes a first booster coil 111 and a second booster coil 112. The first booster coil 111 preferably includes a coil 11 and a coil 13, and the second booster coil 112 preferably includes a coil 12 and a coil 14. The coil 11 and the coil 12 are disposed so as to be adjacent to each other, and connected in series. In the same way, the coil 13 and the coil 14 are disposed so as to be adjacent to each other, and connected in series.

The feed coil 21 is disposed so as to overlap with a position at which the first booster coil 111 and the second booster coil 112 are adjacent to each other.

The winding direction of the second booster coil 112 (12, 14) with respect to the first booster coil 111 (11, 13) is a direction in which the feed coil 21 is coupled to the first booster coil 111 and the second booster coil 112 in a same phase through an electromagnetic field.

Figure 4:
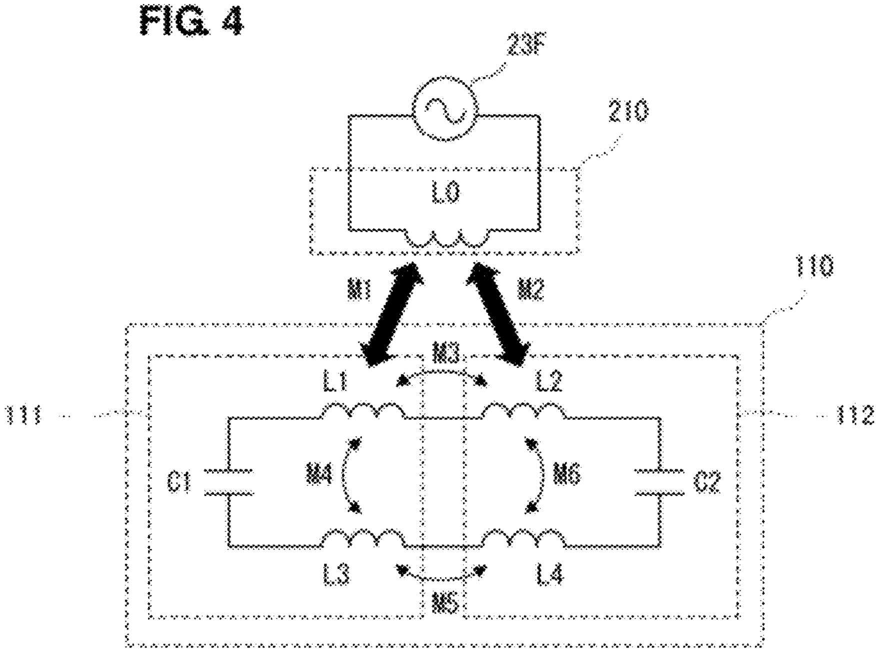
FIG. 4 is an equivalent circuit diagram of an antenna portion of the RFID device 301.

FIG. 4 is the equivalent circuit diagram of the antenna portion of the RFID device 301. Here, an inductor L0 corresponds to the feed coil 21, and a feed circuit 23F is the feed circuit of the RFIC chip 23. In addition, inductors L1, L2, L3, and L4 correspond to the coils 11, 12, 13, and 14, respectively. A capacitor C1 corresponds to capacitance occurring between the coil 11 and the coil 13, and a capacitor C2 corresponds to distributed capacitance occurring between the coil 12 and the coil 14 or capacitance in a pattern.

Mutual inductance M3 corresponds to magnetic field coupling between the coils 11 and 12, and mutual inductance M5 corresponds to magnetic field coupling between the coils 13 and 14. Mutual inductance M4 corresponds to magnetic field coupling between the coils 11 and 13, and mutual inductance M6 corresponds to magnetic field coupling between the coils 12 and 14.

Mutual inductance M1 corresponds to magnetic field coupling between the feed coil 21 and the first booster coil 111 (coils 11 and 13), and mutual inductance M2 corresponds to magnetic field coupling between the feed coil 21 and the second booster coil 112 (coils 12 and 14).

Figure 5A:
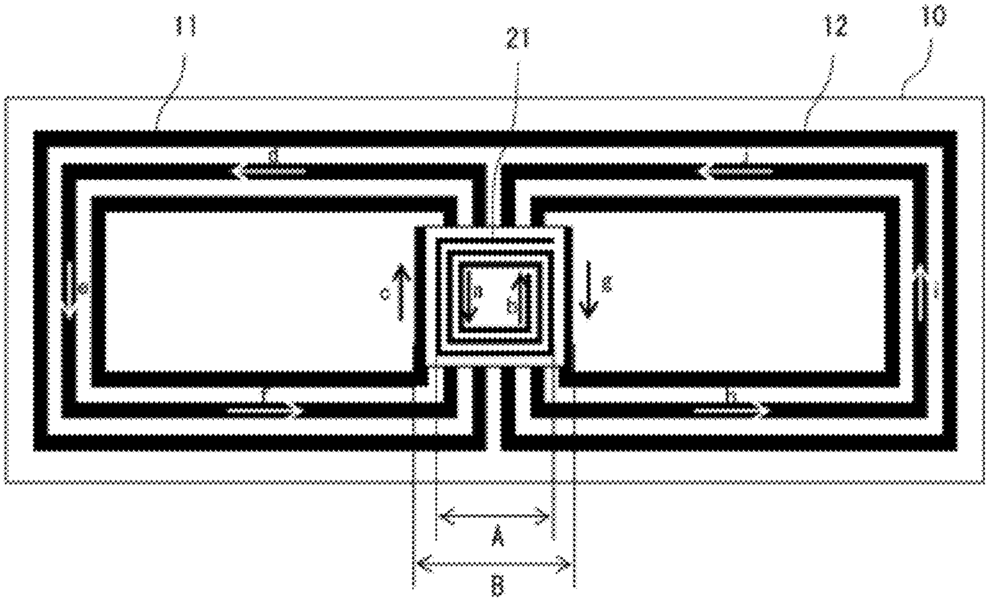
FIGS. 5A and 5B are diagrams illustrating a situation of coupling between feed and booster antennae and a reader/writer antenna.
Figure 5B:
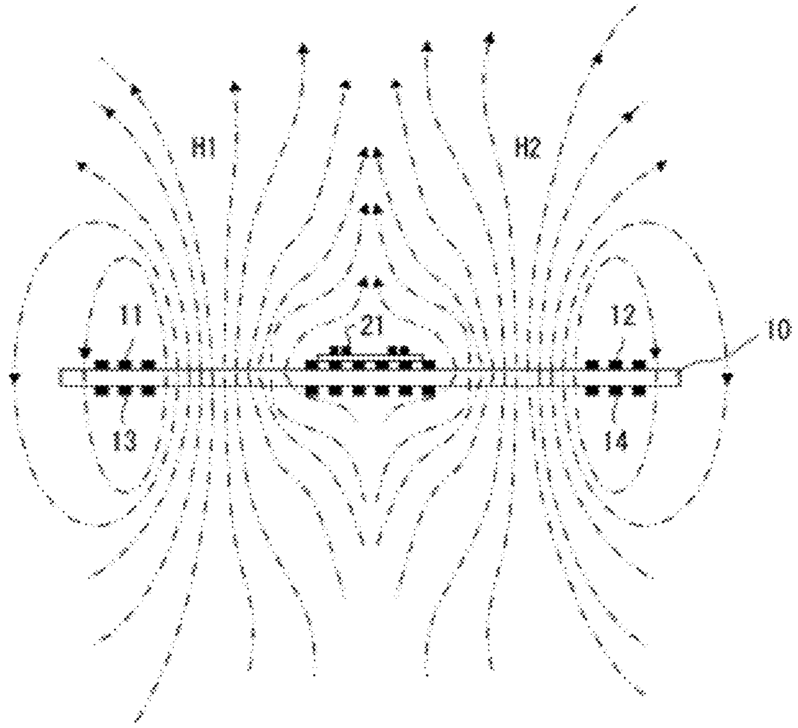

FIGS. 5A and 5B are diagrams illustrating the situation of coupling between feed and booster antennae and a reader/writer antenna. FIG. 5A illustrates the directions of currents flowing in the feed coil 21 and the coils 11 and 12, using arrows. FIG. 5B is a diagram illustrating a situation that the magnetic flux of the reader/writer antenna flows through the feed antenna and the booster antenna, using magnetic lines of force.

As illustrated in FIG. 5A, the feed coil 21 is coupled to the first booster coil (coils 11 and 13) and the second booster coil (coils 12 and 14) through an electromagnetic field. More specifically, if, in the feed coil 21, a left half in FIGS. 5A and 5B is defined as a first region, and a right half therein is defined as a second region, the first region and the second region are disposed so as to overlap with the first booster coil (coils 11 and 13) and the second booster coil (coils 12 and 14), respectively. Accordingly, the first region of the feed coil 21 is coupled to the first booster coil (coils 11 and 13) through an electromagnetic field, and the second region of the feed coil is coupled to the second booster coil (coils 12 and 14) through an electromagnetic field.

Since the feed coil 21 includes an inductance component (the inductor L0 illustrated in FIG. 4) the coil itself has, a capacitance component generated by the line-to-line capacitance of the feed coil 21, and furthermore, stray capacitance the RFIC chip itself has, as a result, the feed coil 21 defines an LC resonant circuit and has a resonance frequency. Hereinafter, this resonance frequency is referred to as "the resonance frequency of the feed coil".

The booster antenna 110 has a resonance frequency generated by an LC resonant circuit including the inductors L1 to L4 and the capacitors C1 and C2.

Accordingly, as illustrated in FIG. 5A and FIG. 5B, when, at a certain moment, currents flow in the feed coil 21 in directions of arrows a and b in the drawings, currents are induced in the coils 11 to 14 in directions of arrows c to j in the drawings. When currents indicated by the arrow a and the arrow b flow in the feed coil 21, currents indicated by the arrow c, the arrow d, the arrow e, and the arrow f flow in the first booster coil (coils 11 and 13) due to the current of the arrow a, and currents indicated by the arrow g, the arrow h, the arrow i, and the arrow j flow in the second booster coil (coils 12 and 14) due to the current of the arrow b. More specifically, currents flow in the first booster coil and the second booster coil in the same direction, and as a result, such a magnetic field H1 and a magnetic field H2 as illustrated in FIG. 5B are generated. The magnetic flux of the reader/writer antenna does not directly pass through the feed coil 21. In other words, the feed coil 21 does not seem equivalent to the reader/writer antenna. Therefore, such a null point as with an antenna of the related art does not occur.

A condition for the magnetic flux of the reader/writer antenna not to directly pass through the feed coil 21 is that a distance B from the inner circumference of the first booster coil (coils 11 and 13) to the inner circumference of the second booster coil (coils 12 and 14) in a portion in which the first booster coil and the second booster coil are adjacent to each other is larger than the width A of the outer circumference of the feed coil 21. The sizes of the feed coil 21 and the coils 11 to 14 and the positional relationships therebetween may be defined so as to satisfy this condition.

According to the antenna according to the first preferred embodiment, it is possible to enlarge the degree of coupling between the feed coil and the booster coil, and the transmission efficiency of an RF signal is high. In addition, it is hard for a null point to occur. In particular, since, as FIGS. 5A and 5B, portions of the feed coil 21 individually overlap with a portion in which the first booster coils 11 and 13 and the second booster coils 12 and 14 are adjacent to one another, and, in the portion in which the booster coils 11 to 14 are adjacent to one another, currents flow whose directions are opposite to each other, a current flows in the feed coil 21 so as to circle around the feed coil 21. Since it is hard for the current flowing in the feed coil 21 to be cancelled out by the currents flowing in the booster coils 11 to 14, it is possible to enlarge the degree of coupling between the feed coil 21 and the booster coils 11 to 14.

Figure 6:
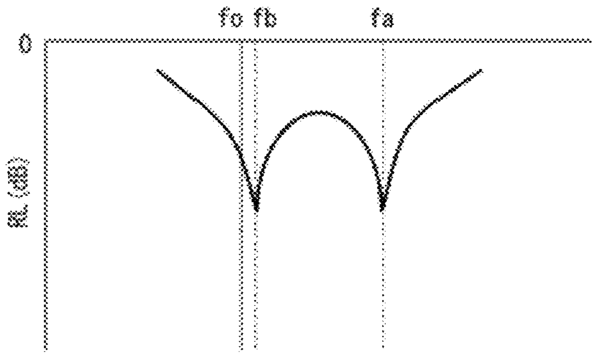
FIG. 6 is a diagram illustrating a relationship between a resonance frequency of a feed coil, a resonance frequency of a booster antenna, and a frequency at which coupling to a reader/writer antenna is established and communication is performed.

FIG. 6 is a diagram illustrating a relationship between the resonance frequency of the feed coil 21, the resonance frequency of the booster antenna, and a frequency at which coupling to the reader/writer antenna is established and communication is performed. A horizontal axis in FIG. 6 is a frequency, and a vertical axis therein is the return loss of an antenna. The resonance frequency fa of the feed coil 21 (or a resonance frequency based on the feed coil 21 and the feed circuit 23F) is higher than the resonance frequency fb of the booster antenna. For example, fa=14 MHz, fb=13.6 MHz, and a communication frequency fo is 13.56 MHz.

If the resonance frequency of the feed coil and the resonance frequency of the booster antenna are equal to each other, degeneracy is resolved, and it is hard for the feed coil and the booster antenna to be coupled to each other. In addition, if the resonance frequency fa of the feed coil is lower than the resonance frequency fb of the booster antenna, the feed coil and the booster antenna are capacitively coupled to each other. However, the capacitive coupling between the coils is not strengthened, and as a result, a high coupling strength is not obtained.

In the first preferred embodiment, as described above, since the resonance frequency fa of the feed coil 21 is higher than the resonance frequency fb of the booster antenna, the feed coil and the booster antenna are inductively coupled to each other, and a high coupling strength is obtained.

In addition, the resonance frequency of the reader/writer antenna is set to the communication frequency fo or the vicinity of fo, and the resonance frequency fb of the booster antenna is set so as to be equal to or approximately equal to the communication frequency fo. In addition, since the resonance frequency fa of the feed coil 21 is set so as to be higher than the resonance frequency fb of the booster antenna and higher than the communication frequency fo, an amount by which the resonance frequency fb of the booster antenna is shifted to a high-frequency wave side is suppressed when the booster antenna and the reader/writer antenna are adjacent and strongly coupled to each other. Therefore, there is obtained an advantageous effect that it is hard for a null point to occur when being strongly coupled to the reader/writer antenna. This utilizes an advantageous effect that, since two adjacent resonators (in this case, the booster antenna and the feed coil) are magnetically coupled to each other, the resonators individually suppress frequency changes in directions in which the resonators come close to each other's resonance frequency.

In addition, as illustrated in FIG. 4, since the inductors L1 to L4 in the booster antenna are coupled to each other owing to the mutual inductances M3 to M6, a whole effective inductance value is larger than an inductance value obtained by the simple sum of the inductors L1 to L4. As a result, it is possible to realize a small booster antenna having an adequate inductance value.

Second Preferred Embodiment

Figure 7:
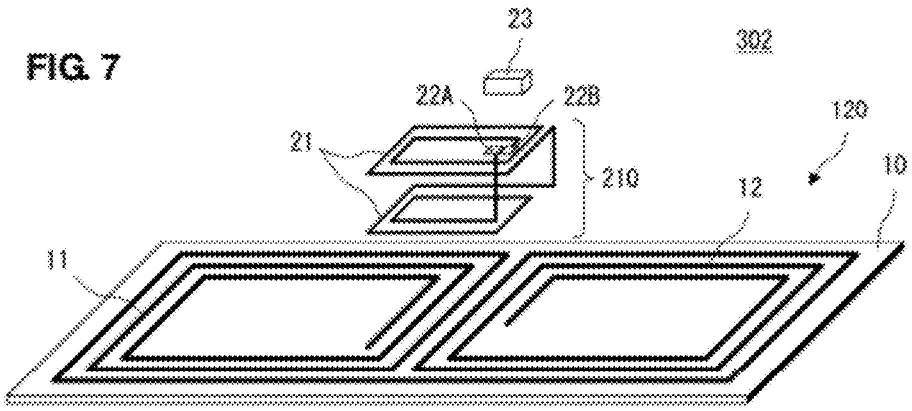
FIG. 7 is an exploded perspective view of an RFID device 302 according to a second preferred embodiment of the present invention.

FIG. 7 is the exploded perspective view of an RFID device 302 according to a second preferred embodiment of the present invention.

This RFID device includes an RFIC chip 23, a feed antenna 210 connected to the RFIC chip 23, and a booster antenna 120 coupled to the feed coil 21 of the feed antenna 210. In FIG. 7, the base material of the feed antenna 210 is not illustrated.

In the second preferred embodiment, a coil 11 is a first booster coil, and a coil 12 is a second booster coil.

Figure 8:
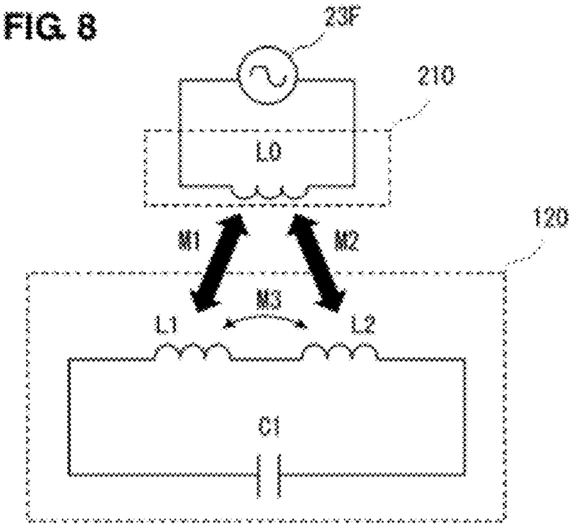
FIG. 8 is an equivalent circuit diagram of an antenna portion of the RFID device 302.

FIG. 8 is the equivalent circuit diagram of an antenna portion of the RFID device 302. Here, an inductor L0 corresponds to the feed coil 21, a feed circuit 23F is the feed circuit of the RFIC chip 23. In addition, inductors L1 and L2 correspond to the coils 11 and 12, respectively. A capacitor C1 corresponds to line-to-line distributed capacitance based on the coils 11 and 12 or capacitance in a pattern.

In this way, the booster antenna may be configured only using two coils 11 and 12 provided in one layer. In this regard, however, as illustrated in the first preferred embodiment, when the booster antenna preferably includes coils provided in a plurality of layers, it is possible to reduce an area necessary to obtain a necessary inductance component and a necessary capacitance component.

Third Preferred Embodiment

Figure 9:
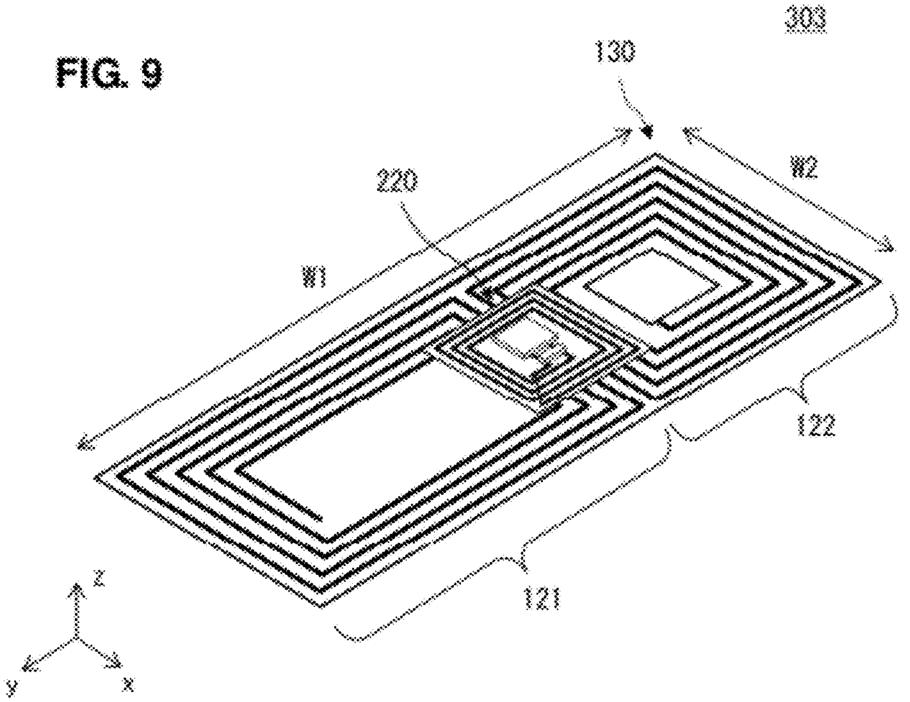
FIG. 9 is a perspective view of an RFID device 303 according to a third preferred embodiment of the present invention.
Figure 10:
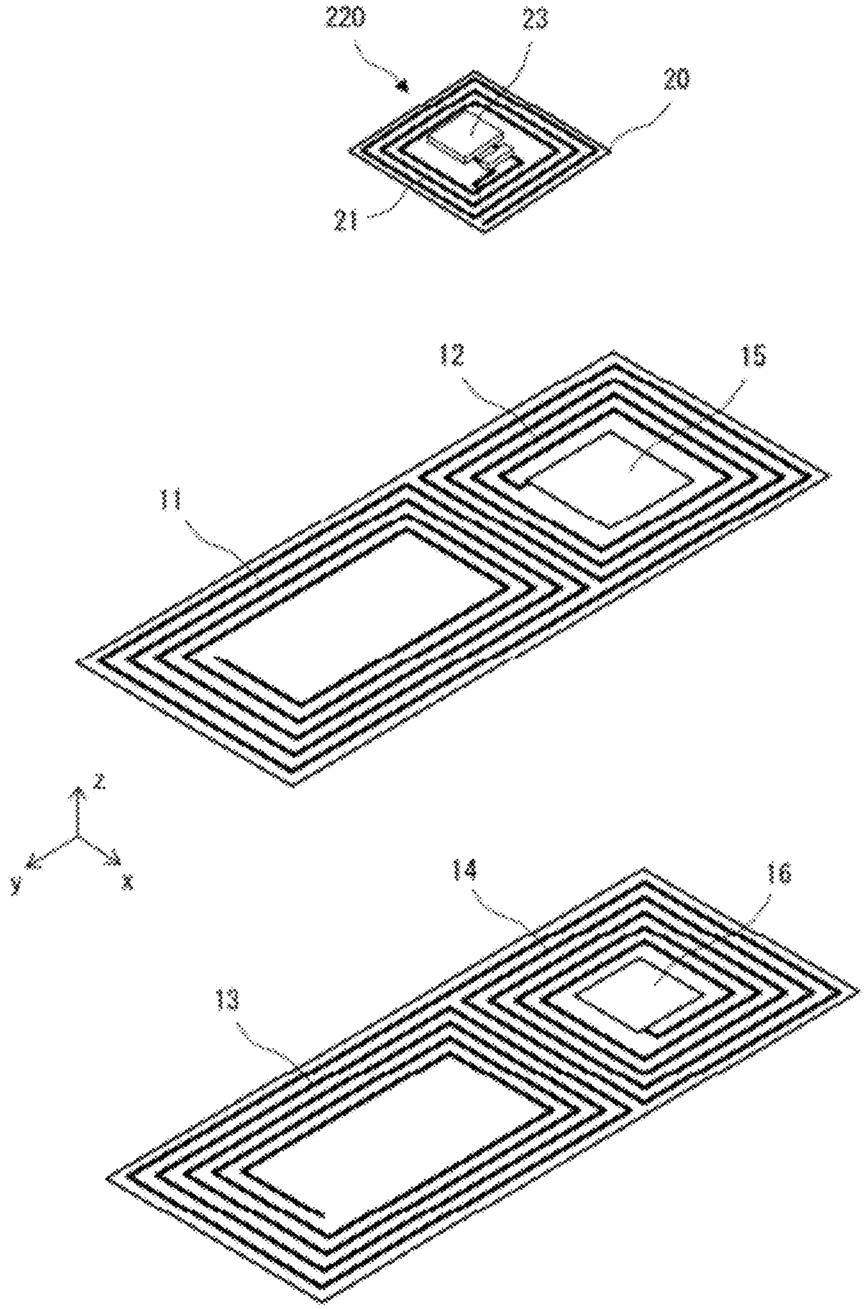
FIG. 10 is an exploded perspective view of the RFID device 303.

FIG. 9 is the perspective view of an RFID device 303 according to a third preferred embodiment. FIG. 10 is the exploded perspective view of the RFID device 303. In this regard, however, in any one of FIG. 9 and FIG. 10, the base material of a booster antenna is omitted, and a conductor portion is only illustrated.

This RFID device 303 includes a feed antenna 220 and a booster antenna 130 coupled to the feed antenna 220.

The feed antenna 220 includes a feed antenna base material 20, a feed coil 21, and an RFIC chip 23. In the feed coil 21, rectangular spiral-shaped conductor patterns of a plurality of turns are provided in a plurality of layers. The RFIC chip 23 is connected to both end portions of this feed coil 21.

The booster antenna 130 preferably includes a first booster coil 121 and a second booster coil 122. The first booster coil 121 preferably includes a coil 11 and a coil 13, and the second booster coil 122 preferably includes coils 12 and 14 and pad electrodes 15 and 16. The coil 11 and the coil 12 are disposed so as to be adjacent to each other, and connected in series. In the same way, the coil 13 and the coil 14 are disposed so as to be adjacent to each other, and connected in series.

The first booster coil 121 preferably includes the coil 11 wound by nine turns and the coil 13 wound by nine turns. The second booster coil 122 preferably includes the coil 12 wound by nine turns and the coil 14 wound by nine turns. In FIG. 9, in order to avoid the complexity of the drawing, any one of the coils is illustrated so as to reduce the number of turns.

The feed antenna 220 is disposed so as to overlap with a position at which the first booster coil 121 and the second booster coil 122 are adjacent to each other. In this state, a portion of the feed coil 21 in the feed antenna 220 overlaps with portions of the coils 11 and 13 in the first booster coil 121, and a portion of the feed coil 21 in the feed antenna 220 overlaps with portions of the coils 12 and 14 in the second booster coil 122.

The winding direction of the second booster coil 122 (12, 14) with respect to the first booster coil 121 (11, 13) is a direction in which the feed coil 21 is coupled to the first booster coil 121 and the second booster coil 122 in a same phase through an electromagnetic field.

A pad electrode 15 is connected to the inner circumference end of the coil 12, and a pad electrode 16 is connected to the inner circumference end of the coil 14. The two pad electrodes 15 and 16 are subjected to pouching, and conductively connected in point of a direct current. The configuration of the first booster coil 121 is basically the same as that of the first booster coil 111 illustrated in FIG. 3 in the first preferred embodiment.

Figure 11A:
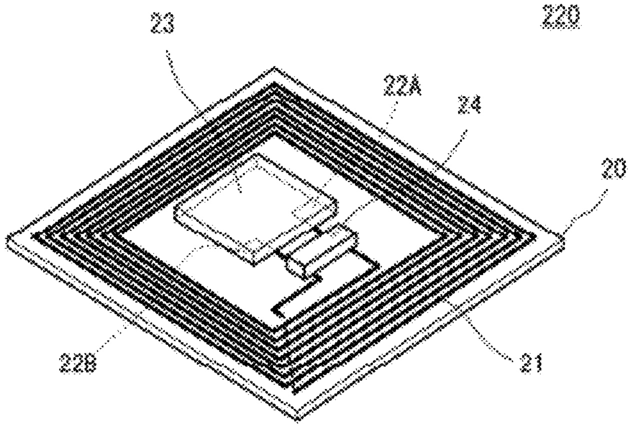
FIG. 11A is a perspective view of a feed antenna 220.
Figure 11B:
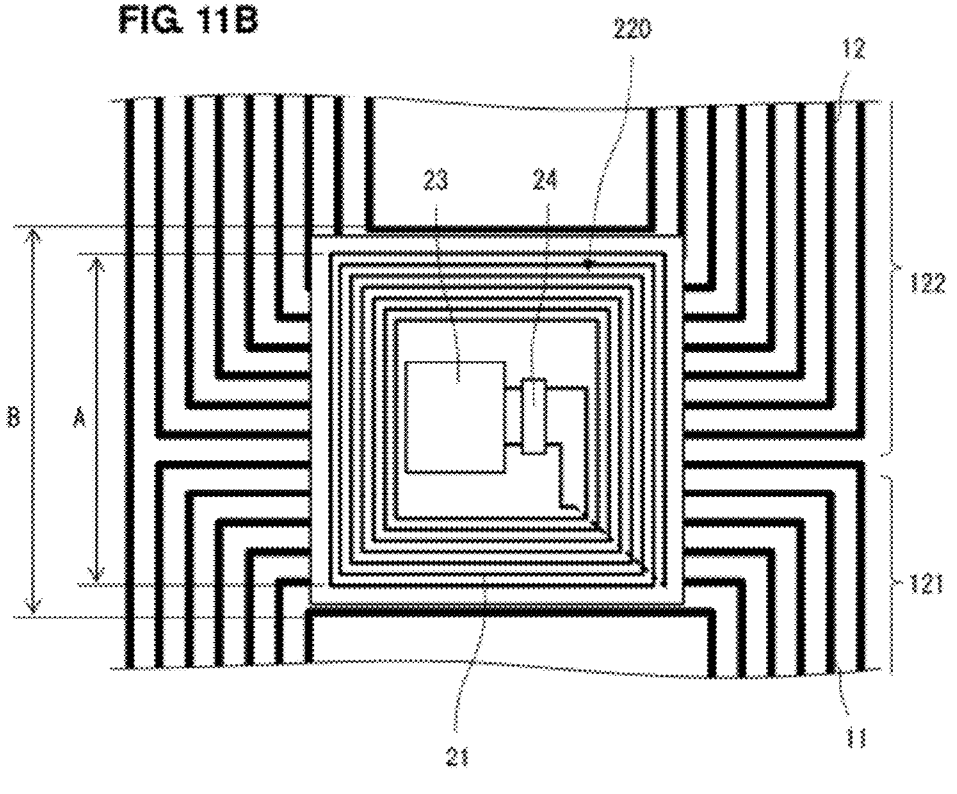
FIG. 11B is a diagram illustrating a positional relationship between a feed coil and a booster coil.

FIG. 11A is the perspective view of the feed antenna 220, and FIG. 11B is a diagram illustrating a positional relationship between the feed coil and the booster coil.

As illustrated in FIG. 11A, the feed antenna 220 preferably includes using rectangular spiral-shaped conductor patterns of two layers, wound by seven turns. The outside dimension of this feed antenna 220 is preferably about 5 $mm^2$, for example. The rectangular spiral-shaped conductor patterns of two layers are connected through an interlayer connection conductor so that the directions of induced currents generated owing to the passage of magnetic fluxes in a same direction are aligned in a same direction. The rectangular spiral-shaped conductor pattern is obtained by subjecting metal foil of copper, silver, aluminum, or the like to patterning on the basis of etching or the like, and this rectangular spiral-shaped pattern is provided in a feed antenna base material 20 including a thermoplastic resin sheet of polyimide, liquid crystal polymer, or the like.

In the feed antenna 220, a capacitor chip 24 is included. The capacitor chip 24 is connected in parallel to the feed coil 21 and the RFIC chip 23. This capacitor chip 24 is provided so as to adjust the resonance frequency of the feed antenna 220. The resonance frequency of the feed antenna 220 is set to 14 MHz.

As is clear from FIG. 10 and FIG. 11B, the feed coil is coupled to the first booster coil (coils 11 and 13) and the second booster coil (coils 12 and 14) through an electromagnetic field. If, in the feed coil 21, a lower half illustrated in FIG. 11B is defined as a first region, and a upper half illustrated in FIG. 11B is defined as a second region, the first region and the second region are disposed so as to overlap with the first booster coil (coils 11 and 13) and the second booster coil (coils 12 and 14), respectively. Accordingly, the first region of the feed coil 21 is coupled to the first booster coil (coils 11 and 13) through an electromagnetic field, and the second region of the feed coil 21 is coupled to the second booster coil (coils 12 and 14) through an electromagnetic field.

If a distance from the inner circumference of the first booster coil (coils 11 and 13) to the inner circumference of the second booster coil (coils 12 and 14) in a portion in which the first booster coil 121 and the second booster coil 122 are adjacent to each other is expressed as B, and the width of the outer circumference of the feed coil 21 is expressed as A, a relationship of A<B is preferably satisfied. According to this relationship, the magnetic flux of the reader/writer antenna does not directly pass through the feed coil 21. Therefore, no null point occurs.

Figure 12:
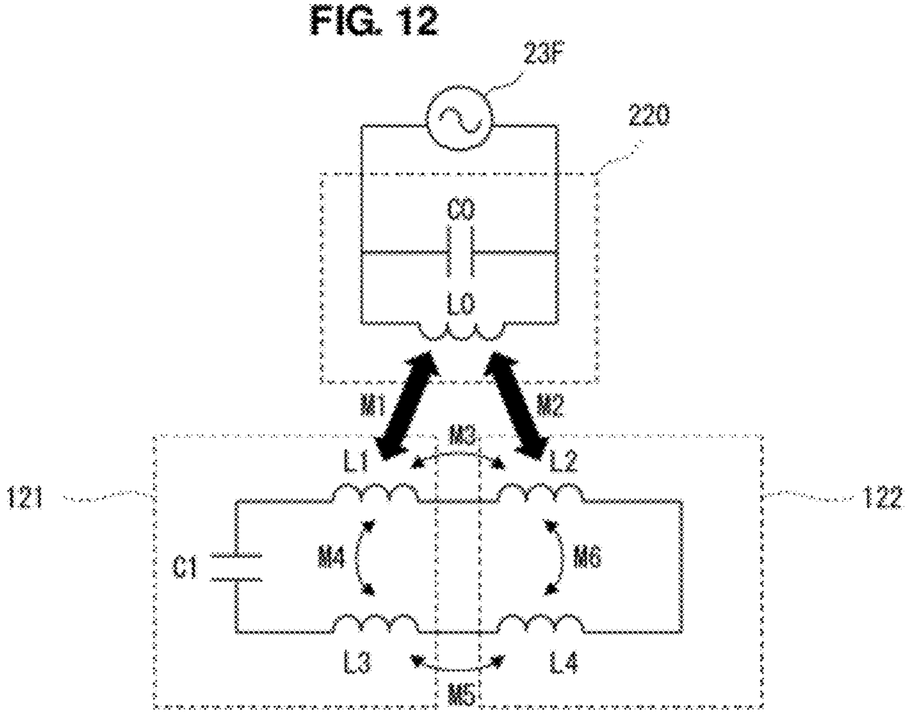
FIG. 12 is an equivalent circuit diagram of an antenna portion of the RFID device 303.

FIG. 12 is the equivalent circuit diagram of an antenna portion of the RFID device 303. Here, an inductor L0 corresponds to the feed coil 21, and a feed circuit 23F is the feed circuit of the RFIC chip 23. In addition, inductors L1, L2, L3, and L4 correspond to the coils 11, 12, 13, and 14, respectively.

A capacitor C1 corresponds to capacitance occurring between the coil 11 and the coil 13.

A capacitor C0 corresponds to the capacitor chip 24 provided in the feed antenna 220. Since the pad electrodes 15 and 16 illustrated in FIG. 10 are subjected to pouching, no capacitor exists that corresponds to the capacitor C2 illustrated in FIG. 4. Therefore, it is possible to enlarge the capacitance component of the booster antenna 130, and it is possible to further reduce the size of a booster antenna necessary for obtaining a predetermined resonance frequency.

The rectangular spiral-shaped conductor pattern defining the booster antenna is obtained by subjecting metal foil of copper, silver, aluminum, or the like to patterning on the basis of etching or the like, and provided in the feed antenna base material 20 including a thermosetting resin sheet of PET or the like. In addition, in the booster antenna 130, the width W1 in a Y direction preferably is about 25 mm, the width W2 in an X direction is about 10 mm, for example. The resonance frequency of this booster antenna is preferably about 13.56 MHz, for example.

In addition, the pad electrode 15 and the pad electrode 16 may be connected to each other using an interlayer connection conductor such as a via hole electrode or the like.

Figure 13:
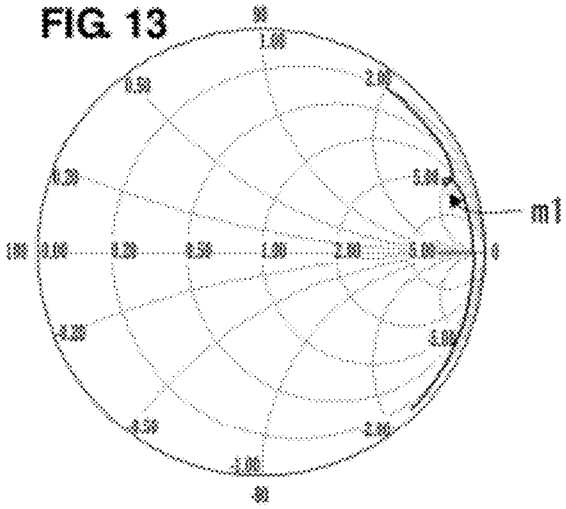
FIG. 13 is a diagram in which a return loss characteristic (S11) of the RFID device 303 is expressed on a Smith chart.
Figure 14:
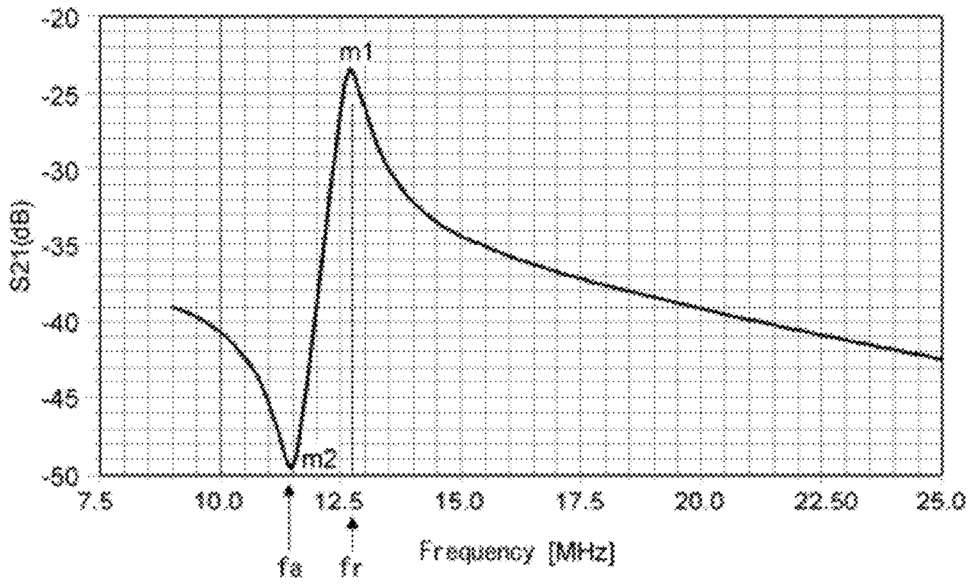
FIG. 14 is a diagram illustrating a transmission characteristic (S21) of the RFID device 303.

FIG. 13 is a diagram in which the return loss characteristic (S11) of the RFID device 303 is expressed on a Smith chart. In this example, a frequency is swept from about 9.0 MHz to about 25.0 MHz, for example. A point indicated by m1 in the drawing corresponds to about 13.56 MHz. In this way, since one loop occurs at a position indicated by m1 in the course of an impedance locus, it is understood that two resonance points occur owing to the coupling between the feed antenna 220 and the booster antenna 130, both of which are LC resonant circuits. In addition, FIG. 14 is a diagram illustrating the transmission characteristic (S21) of the RFID device 303. In this drawing, a frequency fr is a resonance frequency, and fa is an antiresonance frequency. In this way, the resonance frequency fr is set to a frequency in the vicinity of about 13.56 MHz that is an operation frequency.

Fourth Preferred Embodiment

Figure 15:
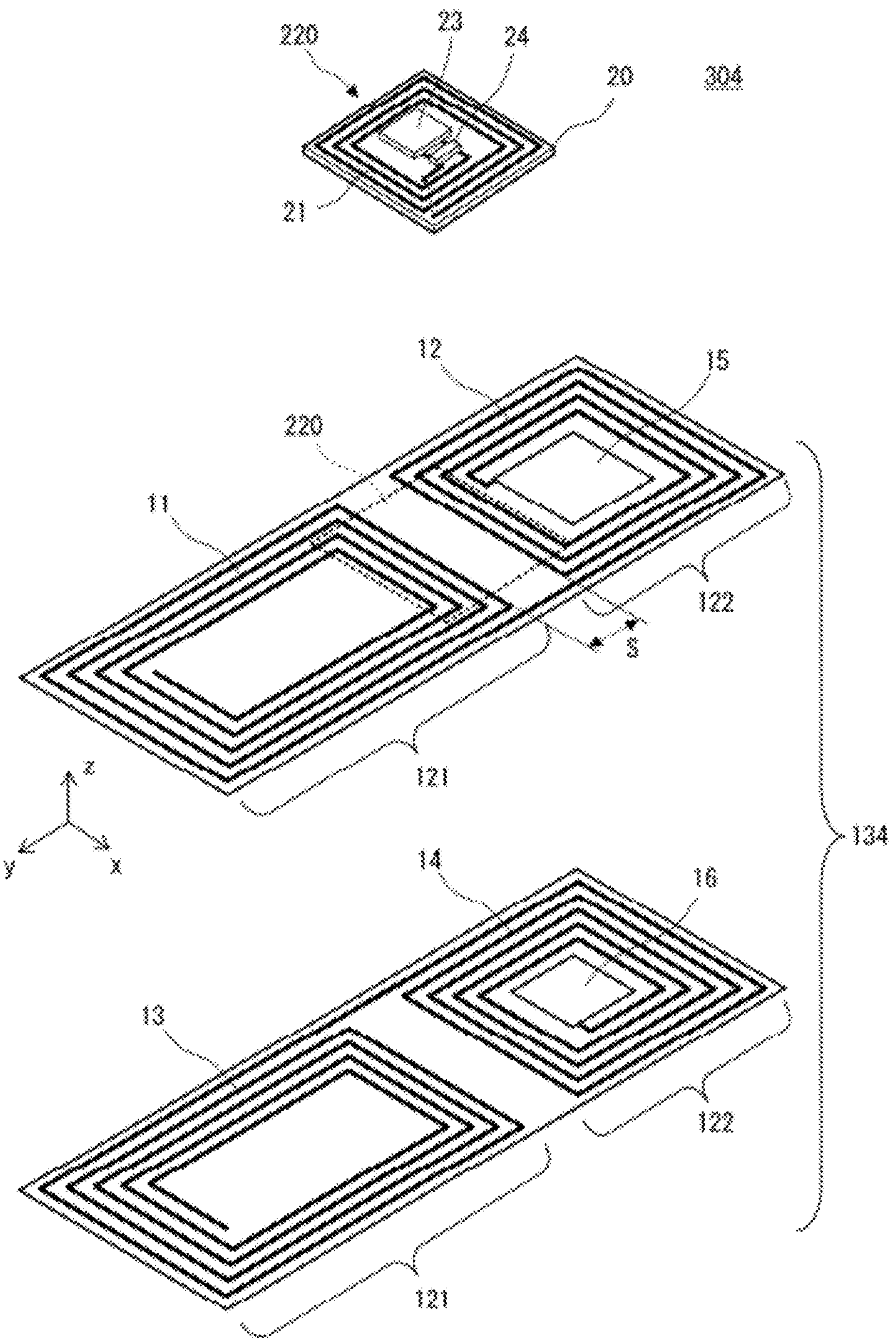
FIG. 15 is a plan view of an RFID device 304 according to a fourth preferred embodiment of the present invention.

FIG. 15 is the plan view of an RFID device 304 according to a fourth preferred embodiment of the present invention. This RFID device 304 includes a feed antenna 220 and a booster antenna 134 coupled to the feed antenna 220.

The feed antenna 220 includes a feed antenna base material 20, a feed coil 21, and an RFIC chip 23. In the feed coil 21, rectangular spiral-shaped conductor patterns of a plurality of turns are provided in a plurality of layers. The RFIC chip 23 is connected to both end portions of this feed coil 21. This feed antenna 220 is the same as the feed antenna 220 illustrated in the third preferred embodiment.

The booster antenna 134 preferably includes a first booster coil 121 and a second booster coil 122. The first booster coil 121 preferably includes a coil 11 and a coil 13, and the second booster coil 122 preferably includes coils 12 and 14 and pad electrodes 15 and 16. The coil 11 and the coil 12 are disposed so as to be adjacent to each other, and connected in series. In the same way, the coil 13 and the coil 14 are disposed so as to be adjacent to each other, and connected in series.

The first booster coil 121 preferably includes the coil 11 wound by nine turns and the coil 13 wound by nine turns. The second booster coil 122 preferably includes the coil 12 wound by nine turns and the coil 14 wound by nine turns. In this regard, however, in FIG. 15, in order to avoid the complexity of the drawing, each coil is illustrated so as to reduce the number of turns.

Different from the third preferred embodiment, in the RFID device 304 in the fourth preferred embodiment, a distance S is provided between the forming region of the coils 11 and 13 and the forming region of the coils 12 and 14 in the booster antenna 134.

The feed antenna 220 is disposed at a position overlapping with each of the first booster coil 121 and the second booster coil 122. In this state, a portion of the feed coil 21 in the feed antenna 220 overlaps with portions of the coils 11 and 13 in the first booster coil 121, and a portion of the feed coil 21 in the feed antenna 220 overlaps with portions of the coils 12 and 14 in the second booster coil 122.

Figure 16:
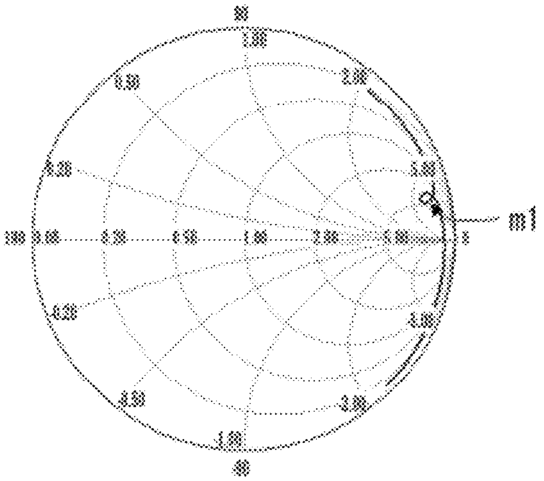
FIG. 16 is a diagram in which a return loss characteristic (S11) of the RFID device 304 is expressed on a Smith chart.
Figure 17:
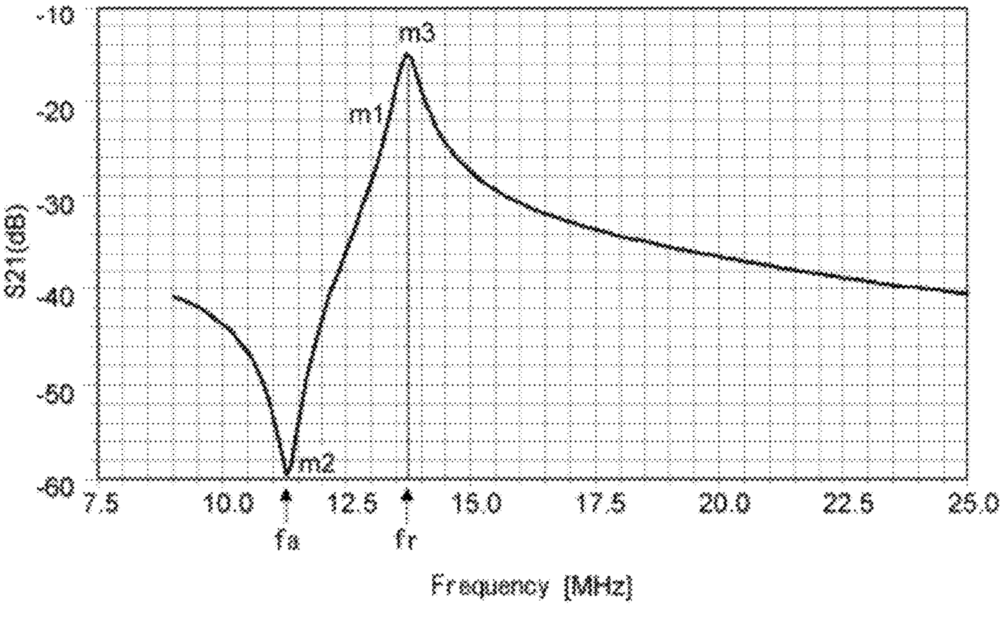
FIG. 17 is a diagram illustrating a transmission characteristic (S21) of the RFID device 303.

FIG. 16 is a diagram in which the return loss characteristic (S11) of the RFID device 304 is expressed on a Smith chart. In this example, a frequency is swept from about 9.0 MHz to about 25.0 MHz. A point indicated by m1 in the drawing corresponds to about 13.56 MHz. According to this structure, since one loop occurs at a position indicated by m1 in the course of an impedance locus, it is also understood that two resonance points occur. In addition, FIG. 17 is a diagram illustrating the transmission characteristic (S21) of the RFID device 303. In this drawing, a frequency fr is a resonance frequency, and fa is an antiresonance frequency. The resonance frequency fr is set to a frequency in the vicinity of about 13.56 MHz that is an operation frequency. As is clear from comparison with the transmission characteristic illustrated in FIG. 14 in the third preferred embodiment, by increasing the distance S between the first booster antenna 121 and the second booster antenna 122 so that the distance S becomes greater than the conductor spacing in the first booster coil and the second booster coil, spacing between the resonance frequency fr and the antiresonance frequency fa is widened. This may be because, since the distance S between the first booster antenna 121 and the second booster antenna 122 is increased and magnetic coupling between the spiral portions of the first booster antenna 121 and the second booster antenna 122 becomes weak, the frequency of the antiresonance point is lowered.

In this way, a difference between the resonance frequency fr and the antiresonance frequency fa becomes large, and hence a difference between the resonance frequency and the antiresonance frequency of the antenna is widened and a gentle resonance characteristic is obtained. Therefore, the deviation of a center frequency due to the degree of magnetic coupling to a communication partner (reader antenna) becomes small, and as a result, a change (variation) in a reading distance becomes small.

Additional Preferred Embodiments

While, in each of the above-mentioned preferred embodiments, each of the feed coil and the booster coil preferably includes the rectangular spiral-shaped conductor pattern, the feed coil and the booster coil may be configured using loop-shaped conductor patterns. In addition, the number of turns may also be one turn as necessary.

In addition, while, in each of the above-mentioned preferred embodiments, a case has been illustrated in which the feed coil is preferably coupled to the first booster coil and the second booster coil mainly through a magnetic field, the feed coil may also be coupled mainly through an electric field, depending on a frequency band. Furthermore, the feed coil may also be coupled through both of the electric field and the magnetic field. This is because, in the case of a high-frequency signal, energy is adequately transmitted even using electrostatic capacitance between the feed coil and the booster antenna.

In addition, while, in each of the above-mentioned preferred embodiments, a case of being applied to the RFID device of the HF band has been illustrated, the present invention is not limited to the HF band, and may also be applied to an RFID device of a UHF band, for example.

In addition, preferred embodiments of the present invention may also be used as an antenna used for an RFID tag, and may also be used as an antenna used for a reader/writer. In addition, the present invention may also be used as an antenna used for a communication system other than the RFID system.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna comprising:

a booster antenna including a first booster coil and a second booster coil; and a feed coil coupled to the booster antenna; wherein the first booster coil and the second booster coil are connected in series;

the first booster coil and the second booster coil are adjacent to each other;

the feed coil overlaps with a portion of the first booster coil and with a portion of the second booster coil at a position at which the first booster coil and the second booster coil are adjacent to each other; and a winding direction of the second booster coil with respect to the first booster coil is a direction in which the feed coil is coupled to the first booster coil and the second booster coil in a same phase through an electromagnetic field.

2. The antenna according to claim 1, wherein the first booster coil and the second booster coil are laminated in a plurality of layers.

3. The antenna according to claim 2, wherein at least one of a pair of the first booster coils adjacent to each other in a layer direction and a pair of the second booster coils adjacent to each other in a layer direction is coupled through capacitance.

4. The antenna according to claim 1, wherein a distance from an inner circumference of the first booster coil to an inner circumference of the second booster coil in a portion in which the first booster coil and the second booster coil are adjacent to each other is larger than a width of an outer circumference of the feed coil.

5. The antenna according to claim 1, wherein a distance between the first booster coil and the second booster coil is greater than a conductor spacing in the first booster coil and the second booster coil.

6. The antenna according to claim 1, wherein a resonance frequency of the feed coil or a resonance frequency of a circuit based on the feed coil and a feed circuit connected to the feed coil is higher than a resonance frequency of the booster antenna.

7. An RFID device comprising:

an antenna according to claim 1; and a feed circuit connected to the feed coil of the antenna; wherein an RFIC is included in the feed circuit.

* * * * *